US011187077B2

(12) United States Patent
Zeng et al.

(10) Patent No.: US 11,187,077 B2
(45) Date of Patent: Nov. 30, 2021

(54) ADAPTIVE WIRELINE TELEMETRY IN A DOWNHOLE ENVIRONMENT

(71) Applicant: Halliburton Energy Services, Inc., Houston, TX (US)

(72) Inventors: Jianqiang Zeng, Cypress, TX (US); Sudhir Kumar Gupta, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/778,238

(22) Filed: Jan. 31, 2020

(65) Prior Publication Data
US 2021/0238992 A1 Aug. 5, 2021

(51) Int. Cl.
E21B 47/13 (2012.01)
H04L 25/02 (2006.01)
H04L 1/20 (2006.01)
H04L 5/00 (2006.01)

(52) U.S. Cl.
CPC .............. *E21B 47/13* (2020.05); *H04L 1/203* (2013.01); *H04L 5/006* (2013.01); *H04L 25/0204* (2013.01)

(58) Field of Classification Search
CPC ..... E21B 47/13; H04L 1/203; H04L 25/0204; H04L 5/006
See application file for complete search history.

(56) References Cited

U.S. PATENT DOCUMENTS

| 4,355,310 | A | * | 10/1982 | Belaigues | G01V 11/002 340/853.2 |
| 5,560,437 | A | * | 10/1996 | Dickel | E21B 47/13 175/40 |
| 5,903,608 | A | * | 5/1999 | Chun | H04L 27/2602 375/260 |
| 6,072,779 | A | * | 6/2000 | Tzannes | H04L 5/0007 370/252 |
| 6,252,901 | B1 | | 6/2001 | Mueller et al. | |
| 6,567,464 | B2 | | 5/2003 | Hamdi | |
| 6,657,551 | B2 | | 12/2003 | Huckaba et al. | |
| 6,667,991 | B1 | | 12/2003 | Tzannes | |
| 7,132,958 | B2 | | 11/2006 | Dodge et al. | |

(Continued)

FOREIGN PATENT DOCUMENTS

WO 2014120988 A1 8/2014
WO 2019050536 A1 3/2019

OTHER PUBLICATIONS

PCT Application Serial No. PCT/US2020/015120, International Search Report, dated Oct. 15, 2020, 3 pages.
(Continued)

*Primary Examiner* — Ryan W Sherwin
(74) *Attorney, Agent, or Firm* — Gilliam IP PLLC

(57) ABSTRACT

One or more adjustment to a set of telemetry communication parameters utilized for providing communications between a surface modem and at least one downhole modem of a borehole logging system are described. The one or more adjustments to the telemetry communication parameters may be made following completion of an initial training of the modems and without the need to power down the surface modem or any of the downhole modem(s) included in the at least one downhole modem.

20 Claims, 7 Drawing Sheets

(56) References Cited

U.S. PATENT DOCUMENTS

| | | |
|---|---|---|
| 7,787,525 B1 | 8/2010 | Clark, Jr. et al. |
| 2001/0010716 A1 | 8/2001 | Smith et al. |
| 2002/0000316 A1* | 1/2002 | Haase .................. E21B 47/12 166/244.1 |
| 2002/0163441 A1* | 11/2002 | Hill ...................... E21B 47/12 340/855.4 |
| 2004/0156264 A1 | 8/2004 | Gardner et al. |
| 2004/0164876 A1 | 8/2004 | Krueger |
| 2005/0046592 A1 | 3/2005 | Cooper et al. |
| 2010/0194586 A1* | 8/2010 | Tjhang .................. G01V 11/002 340/854.7 |
| 2010/0295702 A1 | 11/2010 | Zhao et al. |
| 2012/0249338 A1* | 10/2012 | Merino ................. E21B 47/16 340/854.6 |
| 2013/0226461 A1 | 8/2013 | Yu et al. |
| 2014/0152457 A1 | 6/2014 | Nishisaka et al. |
| 2015/0159482 A1 | 6/2015 | Xu |
| 2015/0229439 A1 | 8/2015 | Stolpman |
| 2016/0108723 A1 | 4/2016 | Pietryka et al. |
| 2016/0298442 A1 | 10/2016 | Orban |
| 2016/0326867 A1 | 11/2016 | Prammer |
| 2017/0261641 A1 | 9/2017 | Fanini et al. |
| 2018/0156031 A1 | 6/2018 | Tran et al. |
| 2018/0220380 A1* | 8/2018 | Croux .................... E21B 47/14 |
| 2018/0348394 A1 | 12/2018 | Wilson et al. |
| 2019/0007159 A1 | 1/2019 | Dufour et al. |
| 2019/0052374 A1 | 2/2019 | Lie et al. |
| 2019/0112916 A1 | 4/2019 | Song et al. |
| 2020/0003046 A1 | 1/2020 | Zheng et al. |

OTHER PUBLICATIONS

PCT Application Serial No. PCT/US2020/015120, International Written Opinion, dated Oct. 15, 2020, 5 pages.

PCT Application Serial No. PCT/US2020/016295, International Search Report, dated Oct. 20, 2020, 4 pages.

PCT Application Serial No. PCT/US2020/016295, International Written Opinion, dated Oct. 20, 2020, 5 pages.

U.S. Appl. No. 16/751,875; Non-Final Office Action; Jul. 1, 2021, 7 pages.

* cited by examiner

ADAPTIVE WIRELINE TELEMETRY IN A DOWNHOLE ENVIRONMENT

BACKGROUND

Modern petroleum drilling and production operations demand a great quantity of information relating to parameters and conditions downhole. Such information may typically include characteristics of the earth formations traversed by the wellbore, along with data relating to the size and configuration of the borehole itself. The collection of information relating to conditions downhole, which is commonly referred to as "logging," can be performed by several methods.

For example, in conventional oil well wireline logging, a probe or "sonde" that includes formation sensors may be lowered into a borehole after some or all of the well has been drilled, and is used to determine certain characteristics of the formations traversed by the borehole. The upper end of the probe or sonde may be attached to a conductive wireline that suspends the probe or sonde in the borehole. Power and data or other types of communications may be transmitted to the sensors and instrumentation in the probe or sonde through the conductive wireline. Similarly, the instrumentation in the sonde communicates information to the surface by electrical signals transmitted through the wireline.

BRIEF DESCRIPTION OF THE DRAWINGS

Embodiments of the disclosure may be better understood by referencing the accompanying drawings.

Figure 1:
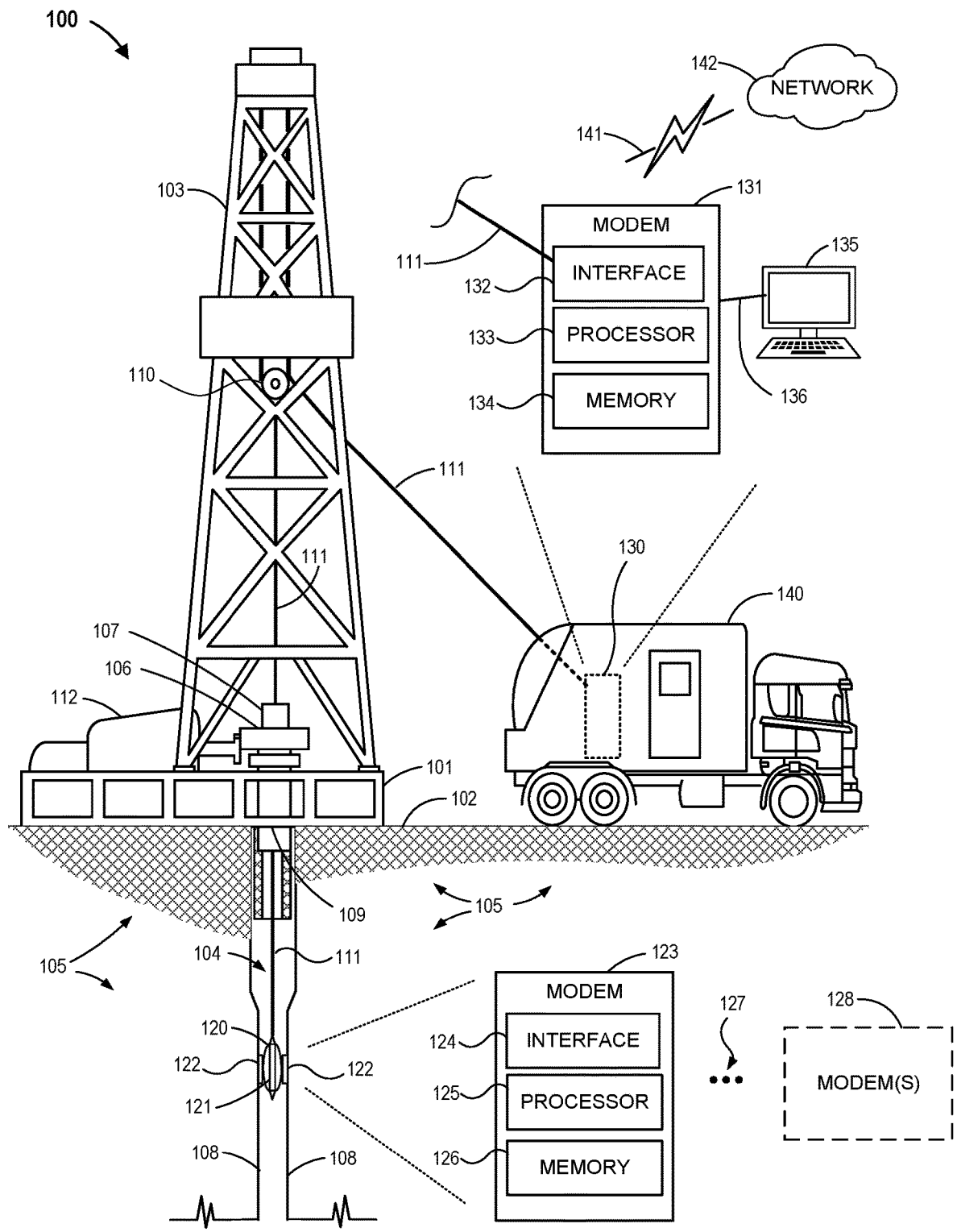
FIG. 1 illustrates a schematic diagram of a logging system for a borehole environment according to various embodiments.

The drawings are provided for the purpose of illustrating example embodiments. The scope of the claims and of the disclosure are not necessarily limited to the systems, apparatus, methods, or techniques, or any arrangements thereof, as illustrated in these figures. In the drawings and description that follow, like parts may be marked throughout the specification and drawings with the same or coordinated reference numerals. The drawing figures are not necessarily to scale. Certain features of the invention may be shown exaggerated in scale or in somewhat schematic form, and some details of conventional elements may not be shown in the interest of clarity and conciseness.

DETAILED DESCRIPTION

Current telemetry systems for telemetry data communications between a surface modem and one or more modems located in a downhole tool of a borehole logging apparatus may utilize known training signals to characterize the cable, noise and telemetry signal levels of the telemetry communications during the start of the loggings, and assign the number of bits to each of a plurality of transmission tones used for transmitting the telemetry communications based on the estimated signal-to-noise ratios (SNRs) on each of the transmission tones based on an initial training signal. Initial telemetry training of the surface modem and the one or more modems located in the downhole tool is done at power up, wherein a data rate for the telemetry communications is defined based on available SNRs. When a logging tools is being positioned and moved within a borehole, the wireline cable characteristics providing the telemetry communications, the noise characteristics, and telemetry signal levels may be changing due to the temperature, pressure, tension, and tools operations associated with the downhole environment. If the SNRs deteriorate enough such that initial bit allocations cannot be supported anymore, constant telemetry data errors are inevitable. This disclosure proposed methods to continually monitoring telemetry conditions during data communications between a surface modem and the logging tool communicatively coupled to the surface modem, and automatically initiates fast retraining or allows for manually initiated fast retraining of the modems to recover the telemetry from errors without power cycling and while minimizing any logging service interruption.

Embodiments disclosed herein include systems, apparatus, methods and techniques for monitoring one or more predetermined telemetry quality indicators, such as packet error rates, synchronization symbol, associated with telemetry communications in a borehole environment. In various embodiments, when a monitored packet error rate becomes greater than a predetermined threshold value, or when synchronization symbol is out of synchronization, or when SNRs are dropped more than a predetermined threshold dB value a fast retraining procedure will start to quickly adapt the telemetry system to the changing conditions without power cycling the tools string and with minimum logging service interruption. In various embodiments, input provided, for example from an engineer or a technician, may be used to manually trigger a fast retraining procedure that again will be initiated to quickly adapt the telemetry system to the changing conditions without power cycling the tools string and with minimum logging service interruption. In various embodiments, the fast retrain may also be triggered after known events which can cause loss of synchronization or loss of SNR, such as a detected jarring of logging tools, turning on of a noisy power supply or noisy tools, or other predefined events. Embodiments as described herein may be arranged to dynamically adapt the telemetry system being utilized for the telemetry communications in a downhole environment to the changing downhole conditions, and also greatly minimizes the service interruption without power cycling the tools string. The advantages may be realized in open hole telemetry, cased hole telemetry, or telemetry for logging while tractoring, to:

Improve robustness;
Reduce non-productive time on rigs;
Reduce user manual intervention and user training; and
Enable a trade-off between size of noise reduction hardware and data rate.

FIG. 1 illustrates a schematic diagram of a logging system 100 for a borehole environment according to various embodiments. System 100 includes a platform 101 positioned on a surface 102, such as the earth's surface, and over a borehole 104 extending into formation 105 below surface 102 and extending between borehole walls 108. Platform 101 supports a derrick 103 extending above the platform 101, and positioned over a top opening 109 of borehole 104. Platform 101 also supports a worktable 106 that may be configured to be driven by a motor 112, such as an electrical or a hydraulic motor, configured to rotate the worktable and in turn a drill string (not illustrated in FIG. 1) that may extend down into the borehole 104. One or more sections of pipe 107 may extend through a central opening in the worktable 106 and through the top opening 109 and into borehole 104 to some distance below surface 102. Pipe 107 may include a central passageway extending through the pipe that is configured to allow a logging tool, such as logging tool 120, to pass through the central passageway of the pipe and be lowered to various depths within borehole 104.

In system 100, a drawworks 110 is suspended from derrick 103 and position over pipe 107. Drawworks 110 is configured to include a mechanism, such as a pulley, that allows a cable, such as conveyance 111, to be positioned so as to align with the central passageway of pipe 107 and the top opening 109 of borehole 104. Conveyance control system 130 is coupled to a proximal portion of conveyance 111, wherein a distal end of conveyance 111 is physically coupled to logging tool 120. Conveyance control system 130 may include a reel and drive mechanism that is configured to extend out more portions of conveyance 111, and to take in portions of conveyance 111 in a controlled manner, thus lowering and raising, respectively, logging tool 120 within borehole 104. Drawworks 110 is configured to pass extended portions of conveyance 111 through the drawworks 110, and thus allow lowing of logging tool 120 through pipe 107 and further depth-wise into borehole 104, and to pull retracted portions of conveyance 111 through the drawworks to allow raising the logging tool 120 up through borehole 104 at some controlled rate, and/or to allow logging tool 120 to be withdrawn complete from borehole 104 through pipe 107. In various embodiments, conveyance control system 130 may be provided as part of a mobile unit 140, such as a truck or a trailer, that may be brought to and removed from the site as part of the logging operation related to borehole 104.

Logging tool 120 itself may include one or more sensors 121 or other instrumentation that may be configured to take measurements related to borehole 104 and/or formation 105 surrounding the borehole while the logging tool is being lowered and/or is being raised within the borehole 104 by control of conveyance 111 using conveyance control system 130. For example, conveyance 111 may comprise a mechanism, such as a cable or a wire, that is configured to support the weight of logging tool 120 throughout the movements of logging tool 120 within, into, and out of borehole 104. In addition, conveyance 111 may include one or more additional electrical conductors, such as conductive wires, multi-conductor cable, or a communication bus that is communicatively coupled to sensors 121, and which may be configured to provide a path for communication signals to be transmitted from and received by sensors 121.

Additional conductors provided throughout the length of conveyance 111 may also include electrical conductors, such as conductive metal wires, configured to provide electrical power, for example electrical power provided by conveyance control system 130 to sensor 121 in order to power the electrical circuits and other devices included in the sensors and/or other instrumentation included in logging tool 120. In various embodiments, electrical power provided by conveyance control system 130 to the logging tool 120 may be used to power one or more electrical power supplies located within the logging tool that are in turn used to power the sensors 121 and/or other instrumentation included in the logging tool.

To provide communications between sensors 121 and/or other instrumentation located in logging tool 120 and the surface, in some embodiments conveyance control system 130 may include a surface modem 131 communicatively coupled to one or more modems illustrated in system 100 as modem 123 and modem(s) 128, which may be referred to as tool modem(s) or downhole modem(s). For example, sensors 121 may be coupled to a single modem 123 that provides communications between the sensors and/or other devices that are located in logging tool 120 with surface modem 131. In various embodiments, various sensors and/or other devices included in logging tool 120 may be communicatively coupled to two or more modems, including modem 123 and one or more additional modems, illustratively represented by modem 128. The number of modems that may be included in logging tool 120 is not limited to any particular number of modems, and may include a single modem such as modem 123, or for example modem 123 and one or more additional modems 128, as illustratively represented by modem 128 dots 127. Regardless of the number of modems included in logging tool 120, each of the modems included in the logging tool 120 may be communicatively coupled to surface modem 131 by one or more electrical conductors coupled to the logging tool running throughout the length of conveyance 111. These electrical conductors may be configured to provide one-way or two-way data communications between the surface modem 131 and one or more of the tool modems located at or within logging tool 120.

Embodiments of modem 131 may include one or more computer processors 133 (hereinafter "processor 133"), which may include or be coupled to one or more computer memories 134 (hereinafter "memory 134"). Processor 133 may be configured to perform various functions related to the configuration and/or operations of sensors and/or other devices located as part of logging tool 120, in some embodiments based on programs and/or other instructions stored in memory 126. In various embodiments, modem 131 may be configured to perform any of the functions and provide any of the features as described herein related to configuring the telemetry communications between conveyance control system 130 and logging tool 120. Embodiments of modem 131 may include a communications interface (hereinafter "interface 132"). Interface 132 may be configured to provide communications, for example data communications and/or command type communications, to and from modem 123 and any other modem(s) that may be included in logging tool 120 and coupled to surface modem 131 through conveyance 111.

In various embodiments of system 100, modem 131 may be communicatively coupled to one or more other devices, such as computer system 135 for example through a wired or wireless communication link 136. Computer system 135 is not limited to any particular type of computer system, and may include for example a personal computer, a laptop computer, a mobile device such as a smart phone, or any type of electronic device capable of performing electrical communications between the computer system 135 and modem 131. In various examples, computer system 135 may be located at the site near borehole 104, and may include one or more input/output devices, such as a display screen, touch screen, keyboard, and/or a computer mouse that would allow an operator, such as an engineer or a technician, to interact with modem 131 and/or logging tool 120. In various examples of system 100, modem 131 and/or computer device 135 may be communicatively coupled to a network 142 through a wired and/or a wireless communication link 141. Network 142 is not limited to any particular type of network and may include a Local Area Network (LAN) or a Wide Area Network (WAN) that provides communicative coupling between modem 131 and/or computer system 135 and one or more other devices (not shown in FIG. 1) that may be located off site relative to borehole 104, but allow data and/or control related instructions related to the logging operations being or to be performed on borehole 104 to be monitored and/or otherwise controlled via communications provided over the network with modem 131 and/or computer system 135.

Embodiments of tool modem 123 may include one or more computer processors 125 (hereinafter "processor 125"), which may include or be coupled to one or more computer memories 126 (hereinafter "memory 126"). Processor 125 may be configured to perform various functions related to the configuration and/or operations of sensors 121 and/or other devices located as part of logging tool 120, in some embodiments based on programs and/or other instructions stored in memory 126. A communications interface ("interface 124") may be coupled to the processor 125. Interface 124 may be configured to provide communications, for example data communications, to and from modem 123 with other device(s) coupled to modem 123 through conveyance 111.

In embodiments of system 100 that include more than one modem (as illustratively represented in FIG. 1 by dots 127 and modem 128), each of these additional modems may include any of the devices, such as separate processor(s), computer memory or memories, and/or interfaces that may be configured to perform any of the functions and provide any of the features described above with respect to the corresponding components from modem 123 and/or as otherwise described for these same or corresponding devices as provided throughout this disclosure.

Different embodiments of logging tool 120 may comprise various combination of sensors, logging tools, and/or power supplies configured to operate the sensors and logging tools and other instrumentation included in the logging tool. Each of these devices included in logging tool 120 may be defined as part of a tool string service profile that defines the requirements, such as data communication and power requirements, that are applicable to the specific sensors, logging tools, power supplies, and other instrumentation included in the particular configuration of the logging tool 120 to be operated in the performance of a borehole logging operation.

When initiating a logging operation for example on borehole 104 using a logging system such as system 100, an engineer or a technician may open a logging software application on a computer system, such as computer system 135. Computer system 135 may be communicatively coupled to modem 131. The operator may load a tool string service profile associated with the configuration of logging tool 120 into the logging software application. Once the operator has loaded the tools string service profile for the particular logging tool configuration associated with logging tool 120 in the logging software application, the requested total telemetry data rate information for the tools string associated with logging tool 120 becomes available as part of the data included in the logging software application. In addition to the total telemetry data rate information, the logging software application may also include a Bit Error Rate (BER) requirements that defines the maximum number of bit errors, which may be defined as a packet error rate, which are acceptable when transmitting data between the logging tool 120 and surface modem 131 using the requested total telemetry data rate. This total telemetry data rate information and the BER requirement information can be sent from the logging software to the surface modem, such as modem 131 in system 100, via a command generated by the logging software application.

An important parameter associated with data communications is a measurement of signal-to-noise ratio (SNR) of the data communications. SNR provides a relative comparison between a signal level of the desired signal, such as the signal carrying the data being communicated, and a level of any noise signal(s) that may be present on the communication line(s). SNR may be expressed as a measurement in units of decibels (dB). The higher the SNR value, the higher the level the signal power is relative to the noise power levels. In some examples, a target minimum SNR value may be set as part of a data communication format. For example, minimum SNR level of 15 dB may be selected for a particular telemetry data communication that is occurring or is going to occur between devices, such as data communications between surface modem 131 and a tool modem, such as modem 131 in system 100. In such instances, the data signal level is 15 dB higher than the level of the noise signal level(s) present with the data signals. An increase to a higher SNR ratio, such as from 15 dB to 18 dB, would indicate that the data signal level has increased, i.e., become stronger, relative to the noise signal level(s). A decrease to a lower SNR ratio, such as from 15 dB to 13 dB, would indicate that the data signal has decreased, i.e., become weaker, relative to the noise signal level(s).

In general, as the SNR values goes up (larger data signal strength relative to the noise signal level present on the signal), the communications become more robust, and the number of bit error occurring as part of the communication may go down. As SNR values goes down (more noise signal relative to the data signal strength), the bit error rate in general is likely to increase. In additional, as the data rate or baud rate increases, the chances of incurring bit errors may also increase. As such, there is a balance between accomplishing speed with respect to the data rates in view of SNR and an acceptable bit error rate when determining parameters for telemetry data communications.

In addition to SNR values, other parameters that affect or that may need to be applied to the data communications between a logging tool such as logging tool 120 and a surface modem such as surface modem 131 may include data rates and bit error rate. Data rates refer to the amount of data that may be communicated in a given time period. In general, a higher data rate requires the transmission of more data bits per unit time compared to a lower or slower data rate. In some examples, this may also be referred to as a baud rate for the data communications, or as a packet rate. In addition, a bit error rate or a packet error rate may refer to the number of errors that occur with respect to an incorrect bit or packet being transmitted and/or received as part of the data communications relative to a total number of bits transferred as part of the data communication. For example, if one bit in every one million bits being communicated as part of a data communication results in an improper data bit being communicated, the bit error rate may be one in one million, or a bit error rate of $10^{-6}$. In embodiments of data communication systems, a maximum allowable bit error rate may be set as part of the requirements for the data communications in addition to a minimum data transmission rate as part of setting the required parameters for a given data communications setup.

In various embodiments of system 100, a Discrete Multi-Tone (DMT) method of formatting the data being communicated between modems, such as surface modem 131 and modem 123 of the logging tool, may be used. Although embodiments of these DMT modem-to-modem communications are described with respect to one surface modem, such as modem 131, that is communicating with one tool modem, such as modem 123, these same methods and techniques may be applied to data communications between more than just two modems, for example but not limited data communications between a surface modem 131 and multiple individual tool modems, such as modems 123-128.

Embodiments of a DMT communications formatting may include determining a number of data bits assigned to represent a DMT symbol. A symbol may represent any data item, such as a letter, a number, or other type of symbol such as a decimal point or a punctuation mark. A DMT symbol may include data bits that represent the particular symbol itself, and one or more additional bits, such as parity or check bits, that are included as part of the symbol. The DMT symbols are transmitted over an available bandwidth by separating the available bandwidth into a plurality of frequency bands, which may be referred to as "tones," or "frequency channels," or "channels," each channel assigned to a particular frequency range having a range of contiguous frequencies defining a width for the channel, and including frequencies uniquely utilized by that particular channel. For example, embodiments of DMT data communications may include separating the available bandwidth into a particular number of channels, in some examples 256 channels, which extend over some predefined range of frequencies. Each channel is assigned to a predefined center frequency, and wherein each center frequency is separated from adjacent channels by a predetermined frequency above and below the center frequency for each channel. Standard versions of DMT utilize a fast Fourier transform (FFT) algorithm to modulate DMT symbols for transmission at a first modem, and to demodulate the DMT symbols at a second modem receiving the DMT transmission. In various embodiments of DMT data transmission, each channel, modulation utilize quadrature amplitude modulation (QAM). The data is partitioned into symbols of m bits, and each symbol is processed as one unit both by encoder and decoder.

Using a DMT data communication formatting includes sending "bursts" that include some predefined number of data bits assigned to one or more of the plurality of frequency channels that are determined to be "available" to transmits at least one bit of data per burst based on the determined SNR assigned for the data transmission, as further described below. Subsequent sets of data "bursts" are used to communicate a plurality of data bits as part of a DMT data communications format. The rate at which that data "bursts" are transmitted, along with the overall number of data bits included with each burst, determine an overall data rate for the data communications. As further described below, the availability of a particular frequency channel to provide data communications including at least one bit on a given burst of data, and the number of bits that may be provided per burst on a particular frequency channel, may be based at least in part of the signal-to-noise ratio present on that particular frequency channel relative to the determined SNR minimum value being utilized for the data transmission. For example, because the data bits used for the data communications are provided in data bursts, and because the total number of bits that may be included in any given data burst is affected by the number of available frequency channels and the number of bits that may be transferred per burst on each of the available channels, the maximum overall data rate for data transmission using the DMT communications formatting, for example between surface modem 131 and tool modem 123, may be dictated by the determined SNR value being used for the data communications. The determined SNR value must be set to a SNR value that allows the data communications to occur while meeting the minimum required data rate and while complying with the BER requirement(s) for the data communications.

In various embodiments of system 100, after surface modem 131 receives the information included in the tool string service profile, the surface modem may then use the requested telemetry data rate as the target data rate, and based on the target BER requirement, determine a minimum signal-to-noise ratio, referred to as the "SNR minimum," that is configured to allow for the data transmissions between the logging tool 120 and surface modem 131 to be carried out at the required total telemetry data rates while not exceeding the maximum BER requirement with respect to the bit error rate for the transmissions. Any data communications between the logging tool 120 and the surface modem 131 is therefore constrained to have a value of no less than the SNR minimum because any data transmissions occurring using an SNR value that is less than the SNR minimum value may not guarantee that the data transmissions can be carried out at the minimum required data rate while meeting the requirement for the maximum allowable level for the BER.

In addition to the determined SNR minimum value, each frequency channel has its own SNR that is estimated for that particular channel. The number of data bits that may be allocated for one burst of data on a particular frequency channel may be determined by the level of the SNR for that particular channel relative to the SNR minimum value, or for example a higher determined SNR value that may be assigned to the data communications. For example, for any frequency channel having a SNR for that particular channel that is less than the SNR minimum value, that particular channel may be considered as being unavailable for allocation of data bits to be transmitted in a data burst. For any frequency channels having an SNR for that particular channel that is at least equal to or above the SNR minimum value may be considered as an available channel, and one or more data bits may be allocated to be transmitted on that frequency channel as part of a data burst.

The number of data bits that may be allocated to any particular available frequency channel in various embodiments may be based on the difference between the estimated SNR value determined for that particular channel and an overall determined SNR value being used for the data transmissions for at least that particular channel, or in some embodiments, for all the available frequency channels. By way of illustration, for a particular frequency channel X being utilized as part of data transmission in a DMT data format, for every 3 dB that the estimated SNR for channel X exceeds the determined SNR value selected for use in the data transmissions, one data bit may be allocated to that channel. Therefore, if channel X is determined to have an estimated SNR value that is 9 dB above the determined SNR value selected for the data communications, three data bits (one data bit each of the 3 dB over determined SNR value) may be allocated to channel X.

Based on the total number of available channels, and based on the total number of bits that may be allocated to each of the available channels using the estimated SNR for each individual available channel and the determined SNR value for the overall data transmissions, a total number of bits that may bits allocated to a give data burst may be made. In further view of the number of data bits required to transmit one symbol, and the rate the data bursts may be transmitted, an overall data transmission rate for the given overall determined SNR value may be determined. If the allocated number of bits meets or exceeds the requirements for data rate transmission, and if the determined SNR is higher than the SNR minimum value, the data transmissions between the modem(s) of logging tool 120 and the surface modem 131 may proceed using the higher determined value of the SNR associated with the data transmission, which is configured to provide data transmission while meeting the requirements for the maximum BER.

Embodiments include surface modem 131 and/or modem 123 beginning modem training by transmitting a signal including a known symbol at a predetermine signal strength to the respective modem configured to receive data transmission from the transmitting modem. For example, surface modem 131 may initiate modem training by transmitting a known symbol, using a DMT communications format, to modem 123 using a predetermined signal strength on each of the frequency channels assigned for downlink data transmissions. Upon receiving the transmission including the known symbol, and knowing the predetermined signal strength, modem 123 determines the received signal strength, and thereby determines an estimated SNR for downlink data transmission, individually, for each of the frequency channels assigned for downlink data transmissions.

Individual estimated SNR values for each frequency channel may be different from other estimated SNR values of other frequency channels and/or a same value compared to one or more other the frequency channels, and may be used, as further described below, to determine the allocation of a different and/or a same number of data bits, respectively, to the individual frequency channels. These estimated SNR values may then be transmitted to the surface modem for use in determining a SNR value and for determining data bit allocations to the frequency channels to be utilized for downlink data communications. In a same or similar manner, modem 123 may transmit to surface modem 131 a known symbol having a predetermined signal strength over each of the frequency channels assigned to transmit uplink data communications between modem 123 and surface modem 131. Upon receiving the transmission including the known symbol, and knowing the predetermined signal strength, surface modem 131 determines the received signal strength, and thereby determines an estimated SNR for uplink data transmissions, individually, for each of the frequency channels assigned for uplink data transmissions.

Once the individual estimated SNR values for the frequency channels have been determined, in various embodiments surface modem 131 initiates the process of allocating data bits to the available frequency channels using one or more proposed SNR values, referred to as the SNR margin level, to determine the number of data bits that may be allocated to each available frequency channel at the proposed SNR values, and thus determines whether the required data rate(s) may be achieved using a data transmission format, capable of providing data transmissions in both the uplink and downlink directions with at least the minimum required data rate and while meeting the requirement for a maximum BER. The modem transceiver training procedure is normally required in order for surface modem and tool modem(s) to establish a reliable communication link. One objective of the training procedure is to measure the characteristics of the wireline cable, and then determine the best system configuration to maximize the data rate and system reliability. The initial training procedure may accomplish this task as soon as the modems are powered up.

After power up, the modems start their operation. In various embodiments the initial training procedure for the modems is controlled by the surface modem. The surface modem may therefore be powered up before the downhole modem(s). When the downhole modem "wakes up," it starts sending to the surface modem a request to start the training procedure. The requests and the acknowledgements of the surface and downhole modems are used to configure the transmission and reception gains at both modems. At the end of the initial training including the gains adjustment process, both modems are operating, transmitting and receiving, with a level optimum to maximize the sensitivity of the system.

After the initial gains adjustment process has been completed, the modems start the training process by sending known training symbols in both directions as described above. These symbols are used in receivers to adjust one more parameters of the telemetry communication to be used to communication between the modems, these parameters may include parameter values associated with Time Domain Equalizer (TEQ), clock recovery, frame alignment, and Frequency Domain Equalizer (FEQ). When all the adaptive parameters of the modems have been adjusted, the modems calculate the SNRs in each of the frequency tones, and then a determination is made as to the number of bits that will be allocated for transmission on each of the available frequency tones based on the SNRs information. In various embodiments, each modem sends to the other modem it is intended to communication with the calculated transmission parameters. In various embodiments, this exchange of parameters is the last stage of the initialization process. After completion of the initialization process, the modems are synchronized and go to the data transaction mode where the modems may start to transmit and/or receive data from one another. As such, following this initial modem training, the surface modem 131 and the downhole modem 123 may switch over to data transaction mode, wherein when in the data transaction mode the surface modem and the downhole modem conduct one-way or two-way data communications between the modems using the telemetry communication format set up for the modems during the initial modem training.

However, during the logging operations being performed on the borehole, various conditions may change or result in a deterioration of the quality of the telemetry communications occurring between the surface modem and the downhole modem. For example, changes in temperatures and/or, pressures in the vicinity of either modem, changes in the tension/temperature/pressure present on or over the length of conveyance 111 that is extended into the borehole may change, and changes in the operation of the tools and/or sensors included in the logging tool, such as switching on off of addition power supplies or sensor tools that generate additional noise signal, may occur after the initial modem training has been completed. These variations may result in changes in the wireline cable characteristics, noise characteristics, and/or changes in the telemetry signal levels that then result in the deterioration of the telemetry communication signals, and an unacceptable level of data transmission errors or loss of data communications altogether may therefore occur.

For example, in the data transaction mode, the wireline cable characteristics, noise characteristics and telemetry signal level will be changing due to the temperature, pressure, and tension. Some tools operations will also cause changes to the noise level. For example, an auxiliary power supply will be turned on to operate a magnetic resonance imaging tool, or an acoustic imaging or scanning tool. The noise from the auxiliary power supply will cause the telemetry errors because the noise from the auxiliary power was not taking into account during the initial training state. Similarly, when a tool starts operating and if it produces noise in the telemetry band, then SNR may deteriorate. When the SNRs deteriorates enough such that initial bit allocations can no longer be supported, constant telemetry data errors are inevitable. To recover from these errors, existing systems may require a power cycling of the tools string to initiate a full training process to get updated system parameters. However, even on power cycling, in this full power-up retraining cannot take into account the switching noise from tools and from power supplies which are not tuned on during the retraining training. This limits the ability of this process to address the issue related to the conditions that may be adversely affecting the telemetry communications occurring during times when the modems are operating in the data transaction mode.

Embodiments as described herein propose apparatus, systems, methods and techniques to monitor the telemetry conditions, such as one or more parameters associated with the telemetry data communications occurring between the surface modem and the downhole modem(s), and in some embodiments to automatically trigger a "fast" retraining session to be conducted to reformat one or more parameters associated with the telemetry communications between the surface modem and the one or more downhole modems in view of the monitored telemetry conditions. In various embodiments, when the surface modem receives a fast retraining command, the surface starts sending a retraining signal to the one or more downhole modems. The downhole modem(s) start sending known training symbols to surface after it receives retraining command signal. The surface modem adjusts the clock, FEQ, and bit allocation parameters based on the estimated SNRs. The surface modem sends known training symbols to the downhole modem(s). The downhole modem(s) adjust the FEQ and bit allocation parameters based on the estimated SNRs determined from the known training symbol sent by the surface mode. After bit allocations parameters are updated in the both surface and downhole modems, the modems will finish the retraining and go back to the data transaction mode, but utilizing telemetry communications based on the one or more communication parameters that were set during the fast retraining procedure.

The retraining may be referred to as "fast" retraining in that embodiments of the retraining do not require the modems (surface modem, one or more downhole modem(s)) to be powered down and powered back up as part of the retraining procedure, and/or only adjust one or more aspect of the data communication formatting to be used for telemetry communications between the surface modem and the one or more downhole modems that occur following the modem retraining. The ability to perform the retraining without the need to power down and power back up the modems, and/or the ability to adjust only particular telemetry communication parameters associated with the retraining of the modems allow the retraining of the modems may allow the retraining to be completed in less time than the time required to perform the initial training of the modems, and may be accomplices using less overall computational steps, for example performed by a computer system and/or computer processor. For example, in embodiments of the fast retraining procedure, only the critical modem parameters will be updated in the fast retraining procedure. Further, the fast retraining procedure may take into account the run time SNR, including the noise from switching noise from tools and power supplies. As such, the retraining may be performed in a shorter time comparted to an initial training session, and with less overall disruption to the system while allowing a more robust and stable telemetry communications to be set up for the modems in view of the changes to the conduct under which the telemetry data communications must be performed going forward.

The fast retraining operation as described in this disclosure may provide one or more advantages over existing systems, including: improved robustness of the telemetry communications; reduced non-productive time on the drilling rig, reduced user manual intervention and user training; and enable a trade-off between size of noise reduction hardware and data rate. Embodiments as disclosed herein may provide the adjustment of the telemetry communication parameters during a fast retrain procedure without the need to rely on pre-stored communication profiles. Embodiments as disclosed herein do not required a dedicated Overhead control Channel (AOC) or Embedded Operation Channel (EOC), or other dedicated communication channels to send updated transmission bit rate parameters. Embodiments as described herein are configured to adjust power level and a number of bits-per-carrier to optimally or near-optimally utilize the capacity of a wireline cable for telemetry combinations in a downhole environment.

Figure 2A:
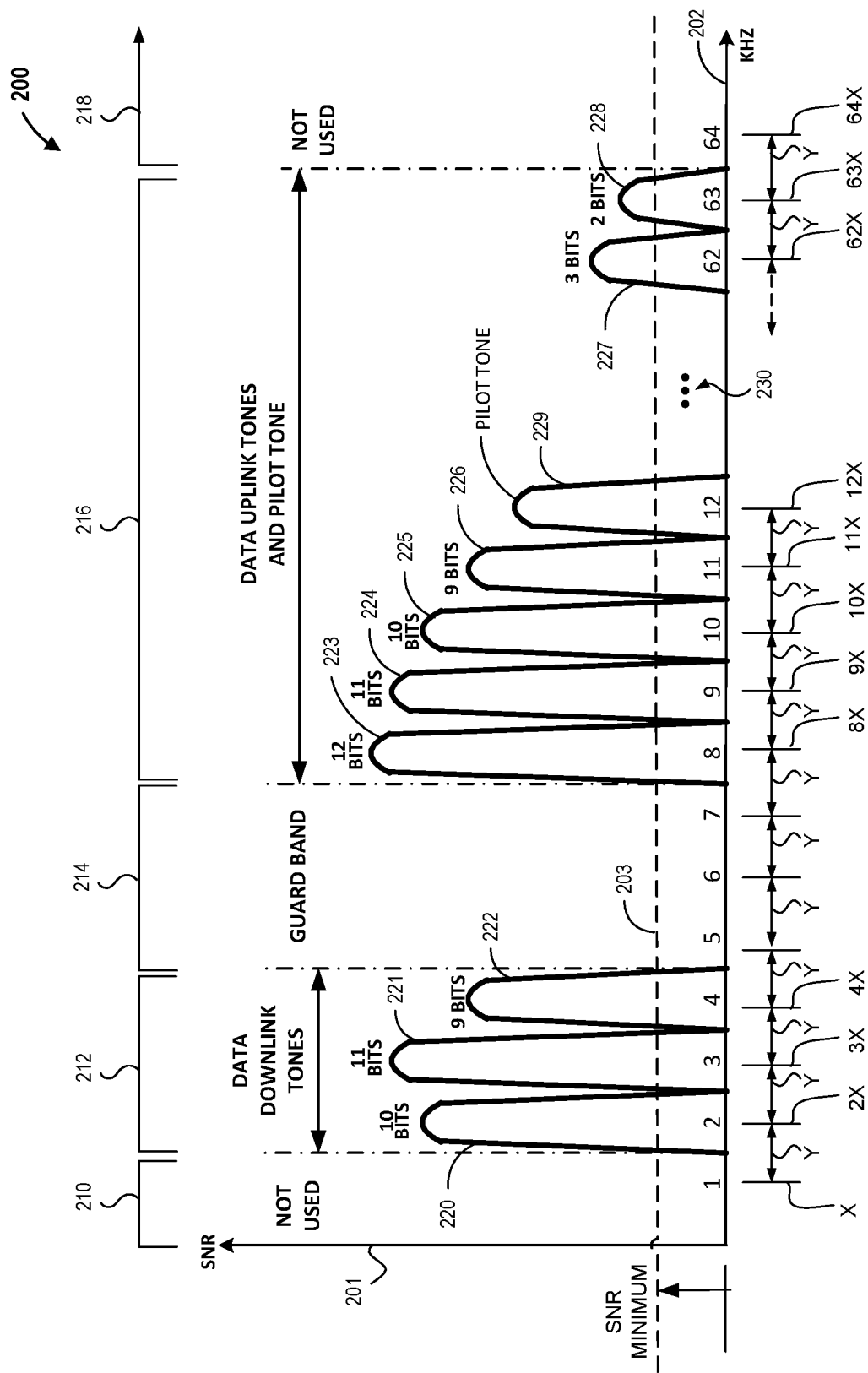
FIG. 2A illustrates a graph showing frequency tones utilized in a discrete-multi-tone telemetry system according to various embodiments.

FIG. 2A illustrates a graph 200 showing various frequency tones utilized in a DMT communication format according to various embodiments. Graph 200 includes a vertical axis 201 representing levels of signal-to-noise ratio (SNR), having increasingly larger values in the upward direction, and a horizontal axis 202 representing frequencies, for example but not limited to frequencies in the kilohertz (kHz) range, and which increase in frequency when moving along axis 202 to the right. Brackets 210, 212, 214, 216, and 218 as shown in graph 200 represent illustrative and non-limiting respective frequency ranges that may be utilized as frequency channels for of the data communications included in the DMT communication format depicted by graph 200. As illustrated in FIG. 2A, each of the channels is assigned a center frequency, such as X, for channel 1, 2X for channel 2, 3X for channel 3, 4X for channel 4, etc., which is unique to that particular channel. Further, each center frequency may be separated from the immediately adjacent frequency channels by a predefined frequency "Y". In various embodiments, the channels being utilized for data communications may be spaced apart from one another by frequency "Y" and extend over a range of frequencies, such as a range extending from 6 kilohertz to 300 kilohertz. In various embodiments, the predefined frequency "Y" may conform to a standard frequency used for standardized DMT communication schemes, which may utilize a predetermined frequency of separation between channels of 4.3125 kilohertz.

Bracket 210 represents a first frequency range, and as shown in graph 200, represents frequencies that may not be used or available for data communications in the embodiments of the DMT communication format. Bracket 212 represents a second frequency range, and represents a frequency range that may be utilized for tones assigned to frequency channels associated with data downlink communications.

Bracket 214 represents a third range of frequencies that includes a guard band range of frequencies. The guard band may be utilized to provide assured separation of the tones of the frequency channels being utilized for downlink communications from the tones of the frequency channels being utilized for uplink communications. Bracket 216 represents a fourth frequency range including frequencies that may be used for tones assigned to frequency channels associated with data uplink communications, and a pilot tone. Bracket 218 represents frequencies extending above the fourth band of frequencies, and includes frequencies that may not be used for communications in the embodiments of the DMT communication format.

As illustrated in graph 200, the various frequency ranges represented by at least brackets 212 and 216 may be divided into separate "tones" or "channels" or "frequency channels." Each frequency channel is centered around a separate and different center frequency unique to that frequency channel. These individual frequency channels are indicated by numbers, 1 through 12 and 62 through 64, as shown in graph 200 extending along horizontal axis 202. For example, a channel 1 is shown positioned within the frequency ranges included below bracket 210. No data bits are allocated to channel 1 as depicted in graph 200. Three separate channels, numbered 2, 3, and 4, are illustrated in graph 200 within the data downlink tones including frequency channels indicated by bracket 212. Channel 2 (ref. number 220), includes a tone having a center frequency at "2X", with 10 bits allocated to channel 2. Channel 3 (ref. number 221), includes a tone having a center frequency at "3X", with 11 bits allocated to channel 3. Channel 4 (ref. number 222), includes a tone having a center frequency at "4X", with 9 bits allocated to channel 4. Channels 3, 2, and 4, as depicted in graph 200, are the frequency channels dedicated to communicate downlink data, for example communication data being transmitted from a surface modem (e.g., modem 131, FIG. 1) to one or more modems (e.g., modems 123, 128, FIG. 1) of a logging tool.

Seven separate frequency channels are illustrated in graph 200 within the data uplink tones as generally indicated by bracket 216. Channel 8 (ref number 223), includes a tone having a central frequency at "8X", and having 12 bits allocated to channel 8. Channel 9 (reference number 224), includes a tone having a central frequency at "9X", and having 11 bits allocated to channel 9. Channel 10 (ref. number 225), includes a tone having a central frequency at "10X", and having 10 bits allocated to channel 10. Channel 11 (ref. number 226), includes a tone having a central frequency at "11X", and having 9 bits allocated to channel 11. Channel 62 (ref number 227), includes a tone having a central frequency at "62X", and having 3 bits allocated to channel 62. Channel 63 (ref. number 228), includes a tone having a central frequency at "63X", and having 2 bits allocated to channel 63.

Channels 8 through 12, 62, and 63, as depicted in graph 200, are the frequency channels dedicated to communicate uplink data, for example data communications transmitted from one or more modems (e.g., modems 123, 128, FIG. 1) of a logging tool to a surface modem (e.g., modem 131, FIG. 1). Additional channels, such as channels 13 through 61, which are illustratively represented in graph 200 by dots 230, may be included within the frequency range indicated by bracket 216, and in various embodiments may be utilized as addition channel(s) for uplink communications, but are not depicted in graph 200 for simplicity purposes only. In addition, the uplink tones included within the range of frequencies indicated by bracket 216 may also include a pilot tone, illustrated as channel 12 (ref number 229), having a central frequency at "12X". Additional frequencies, not specifically illustrated in FIG. 2A, may be assigned to the downlink tones, but are not depicted in graph 200 for simplicity purposes only.

As shown in graph 200, channel 1 has a center frequency at "1X", is positioned to the left of channel 2, and has a lower center frequency compared to channel 2, and is not allocated any bits for data communication. Channel 64, having a center frequency at "64X", is positioned to the right of channel 63, has a higher center frequency relative to channel 63, and is not allocated any bits for data communication. As such, the frequency ranges included in channels 1 and 64 may act as guard bands below and above, respectively the frequency ranges over which the data communications depicted by graph 200 are supposed to operate within.

In addition, frequency channel 5 having a center frequency at "5X", frequency channel 6 having a center frequency at "6X", and frequency channel 7 having a center frequency at "7X", include frequencies between frequency channels 4 and 8. Frequency channels 5, 6, and 7, as depicted in graph 200, are not allocated data bits, and are labeled as providing a guard band between the frequencies allocated bit assigned to data downlink communication and frequency channels allocated data bits assigned to the upline data communications. These guard band may help minimize or eliminate cross-talk between the downlink communication being performed by channels 2 through 4 and the uplink communication that may be performed using channels 8 through 12, 62, and 63.

As shown in graph 200, each of tones 2 through 4, 8 through 12, 62, and 63 includes a signal-to-noise ratio level, indicated by the peak of the frequency tone, that is specific to that frequency channel, and that is above the SNR minimum indicated by line 203. As further described above, modem training may include determining an estimated SNR for each of the frequency channels. The number of bits that are allocated to a particular frequency channel may be determined based on the amount that the estimated SNR value for that particular channel exceeds the SNR minimum level. In some embodiments, one bit may be allocated to a tone for every 3 dB that the SNR for that tone exceeds the SNR margin level.

In various embodiments of a telemetry communications system using a DMT format, the number of bits that can be carried at each tone for a desired maximum Bit Error Rate (BER) is given by:

$$b_i = \log_2\left(1 + \frac{10^{\frac{SNR_i}{10}}}{10^{\frac{\Gamma_{min}}{10}}}\right) \quad \text{Equation (1)}$$

wherein the $\Gamma_{min}$ is the SNR minimum value that should exist on a given data transmission to insure the desired BER performance can be obtained, for the data transmission, and wherein $SNR_i$ is the estimates of the SNR values of each of the $i_{th}$ tones. The individual SNRi values may be determined by sending a known training signal, for example including data representing a known DMT symbol, between a first modem, such as the surface modem, and to another modem, such as a downhole modem or vice versa. When the modem receives the known training signal S_r, it is equal to S_r=S_t+Noise, wherein S_t is the known training signal and "Noise" is the signal strength of any noise signals received with the known training signal. The Noise can be estimated by Noise_estimate=S_r−S_t, and then the SNR can be determined by the formula:

$$\text{SNR}=10*\log 10(S\_t^2/\text{Noise\_estimate}^2) \quad \text{Equation (2)}$$

wherein SNR is the signal power to noise power ratio for the frequency channel used to transmit the known training signal. This process may be repeated for each of the available frequency channels, and thereby establishing an estimated SNR for each individual frequency channel. The total number of bits carried by the DMT system per DMT symbol is:

$$b_{total}=\Sigma_{i=1}^{N} b_i \quad \text{Equation (3)}$$

wherein bi is the number of bits allocated to the $i_{th}$ channel, and N is the total number of channels to which bits may be allocated.

Based on the $b_{total}$ total number of bits carried per DMT symbol, the training data rate (R) may be determined as follows:

$$R = \frac{b_{total}}{T_{symbol}} \quad \text{Equation (4)}$$

wherein Tsymbol is the total number of symbols to be transmitted per unit time.

With the estimated SNRs information determined for each tone, the modems start the bit allocation iteration routine to utilizing the initially set value (dashed line 203) for the SNR margin, to determine the number of bits that can be carried on each of the available frequency tones at the SNR margin value. As described above, in various embodiments the allocation for a given tone is based on the amount that the estimated SNR for that tone is above or higher than the proposed SNR margin value that is being used for that particular round of data bit allocations. The iteration routine initializes the targeted total number of bits to $b_{target}$ and SNR margin Γ to Γ $_{max}$. For each frequency tone, the iteration routine determine the number of bits can be carried on this tone as:

$$b_i = \log_2\left(1 + \frac{10^{\frac{SNR_i}{10}}}{10^{\frac{\Gamma}{10}}}\right) \quad \text{Equation (5)}$$

wherein SNRi is the SNR for $i_{th}$ frequency tone, and Γ is the proposed SNR margin level being used to determine the bit allocation across all the tones (see e.g., SNR margin line 203A in graph 270).

Using tone 2 as an example, 10 bits have been allocated to tone 2. In various embodiments, the allocation of 10 bits to tone 2 would be based on tone 2 having an estimated SNR that is 30 dB (3 dB times 10 bits) above the dB level set for the SNR minimum value. As shown in FIG. 2A, each of these frequency channels 2-4, 8-12, 62, and 63 would meet the SNR requirements for a tone that may be used for data transmission of one or more bits when the SNR for the data transmission by having an estimated SNR level that is at least a minimum level, for example 3 dB, above the level of SNR minimum as indicated by dashed line 203. In alternative embodiments, one or more of the frequency channels may not be capable of providing a signal-to-noise ratio level that is above a proposed or minimum SNR level. In such instances, these channels are not considered to be "available," and may not be used for data transmission, and any bits initially allocated to these tones may be reallocated to other tones that can accommodate an allocation of additional bits.

Once the bit allocation has been made, for example as illustrated in graph 200, the surface modem and for example a downhole modem may switch over to a data transaction mode, and telemetry communication may be made to and/or from each of the modems. While in the data transaction mode, the telecommunications are monitored, and based on one or more criteria being monitored, such as a monitored parameter associated with telemetry communications changing a predetermined amount, or falling below a predefined performance level, a fast retrain procedure may be triggered. During the retraining the surface modem and the one or more downhole modems having telemetry communications occurring between these devices may be switched to a retraining mode, and one or more parameters associated with the telemetry communications to be conducted between these modes going forward is adjusted based on a reevaluation of the current status of and the conditions under with the telecommunications are going to be performed under. Adjusting the one or more communication parameters may include performing a reallocation of the number of bits assigned to the available frequency tones being utilized in a DMT communication format for providing the telemetry communications between the modems, and further illustrated and described below with respect to FIG. 2B.

Figure 2B:
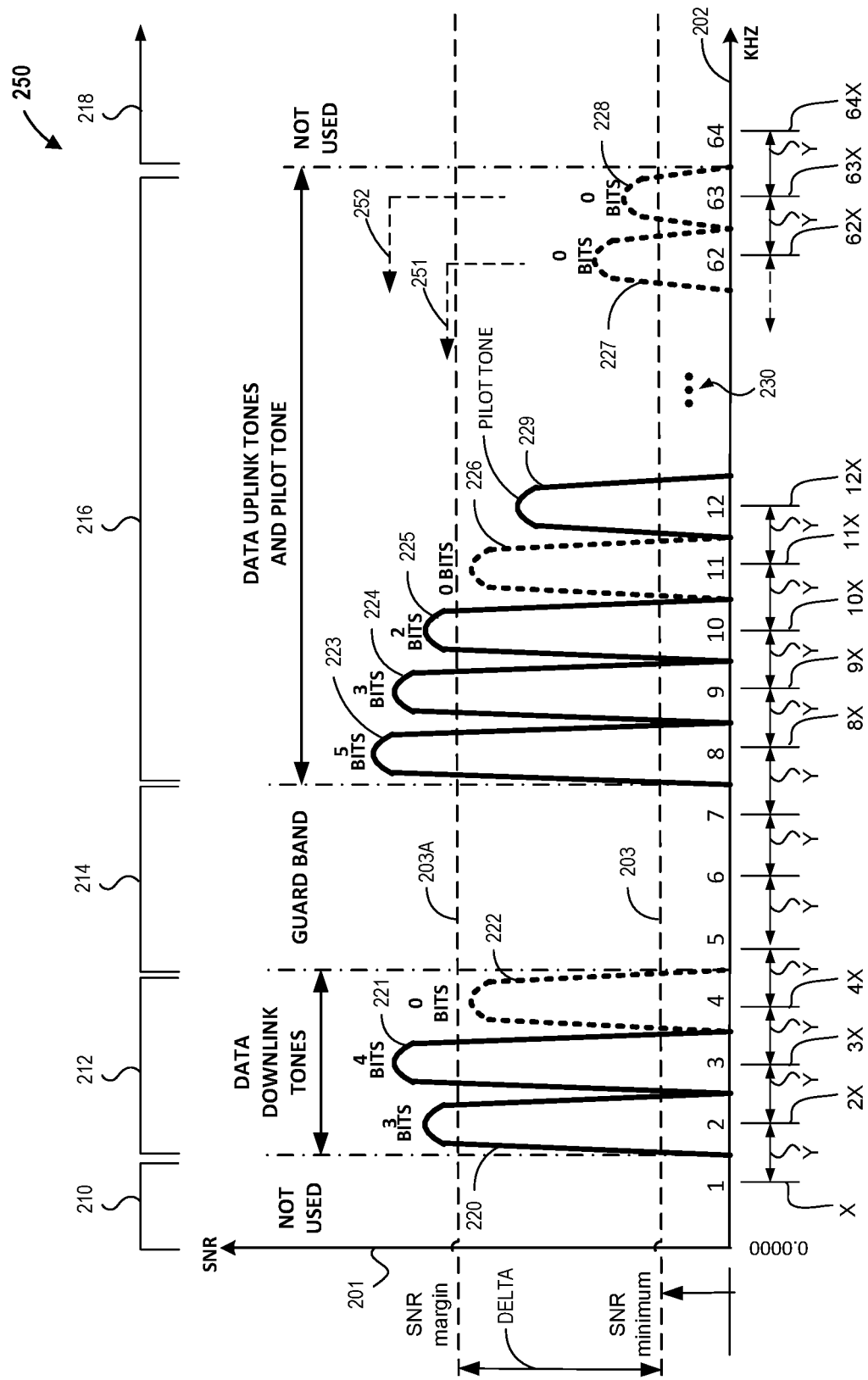
FIG. 2B illustrates a graph showing manipulation of frequency tones utilized in a discrete-multi-tone telemetry system according to various embodiments.

FIG. 2B illustrates a graph 250 showing manipulation of data bit allocations based on SNR margin values utilized in a discrete-multi-tone telemetry system according to various embodiments. Graph 250 includes many of the same features illustrated and described above with respect to FIG. 2A and graph 200, including a set of data downlink tones (tones 2 through 4) separated by a guard band (indicated by bracket 214) and a set of data uplink tones 8 through 12, 62, and 64). In graph 250 as shown in FIG. 2B, a noise level present in the telemetry communications occurring between modems may have increased on one more of the frequency tones being utilized for bit allocations in the telemetry communications between the modems. As such, a new SNR margin level, indicated by horizontal dashed 203A in graph 250, may be used to determine a number of bits allocated to one or more of the frequency channels as part of a fast retrain procedure.

As illustrated in graph 250, at an SNR margin value illustrated by dashed line 203A, frequency channel 4 including in the data downlink tones and frequency channels 11, 62, and 63 of the data uplink tones do not provide a channel having an estimated SNR value that is above the higher SNR margin value indicated by dashed line 203A. As such frequency channels 4, 11, 62, and 63 are no longer frequency channels that are available for allocations of data bits, as illustratively represented by these tones being shown in graph 200 as dashed lines, and an indication of zero (0) bits being allocated to each of these same frequency channels. Any data bit allocations that may have previously been assigned to these channels when using the SNR minimum value must now be reallocated, if possible, to some other frequency tone that is available and has capacity for these additional bits, for example as represented by dashed arrows 251 and 252 illustratively representing the relocation of data bit from frequency channels 62 and 63, respectively.

In addition, one or more of the frequency channels that remain available for data bit allocations using the higher SNR margin value represented by dashed line 203A may also have capacity for a smaller total number of bits that can be allocated to the frequency channel compared to the number of bits that could be allocated to these same frequency channels at the SRN minimum value. Due to the potential loss in the number of data bits that may be allocated to the available frequency channels at the higher SNR margin value, the due to the total number of bits that may be allocated across the available frequency channels, raising the SNR value to the higher value above the SNR minimum value may or may not continue to allow an allocation of an adequate number of data bits per data burst that still provides the required data rates using the SNR margin value. The reallocation of the number of bits may be determined during a retraining mode activated for the modems, and result in the modems returning to a data transaction mode following the retraining, wherein telemetry communication between the modems is based on the reallocation of the number of bits assigned to each frequency tone during the retraining procedure.

Figure 3A:
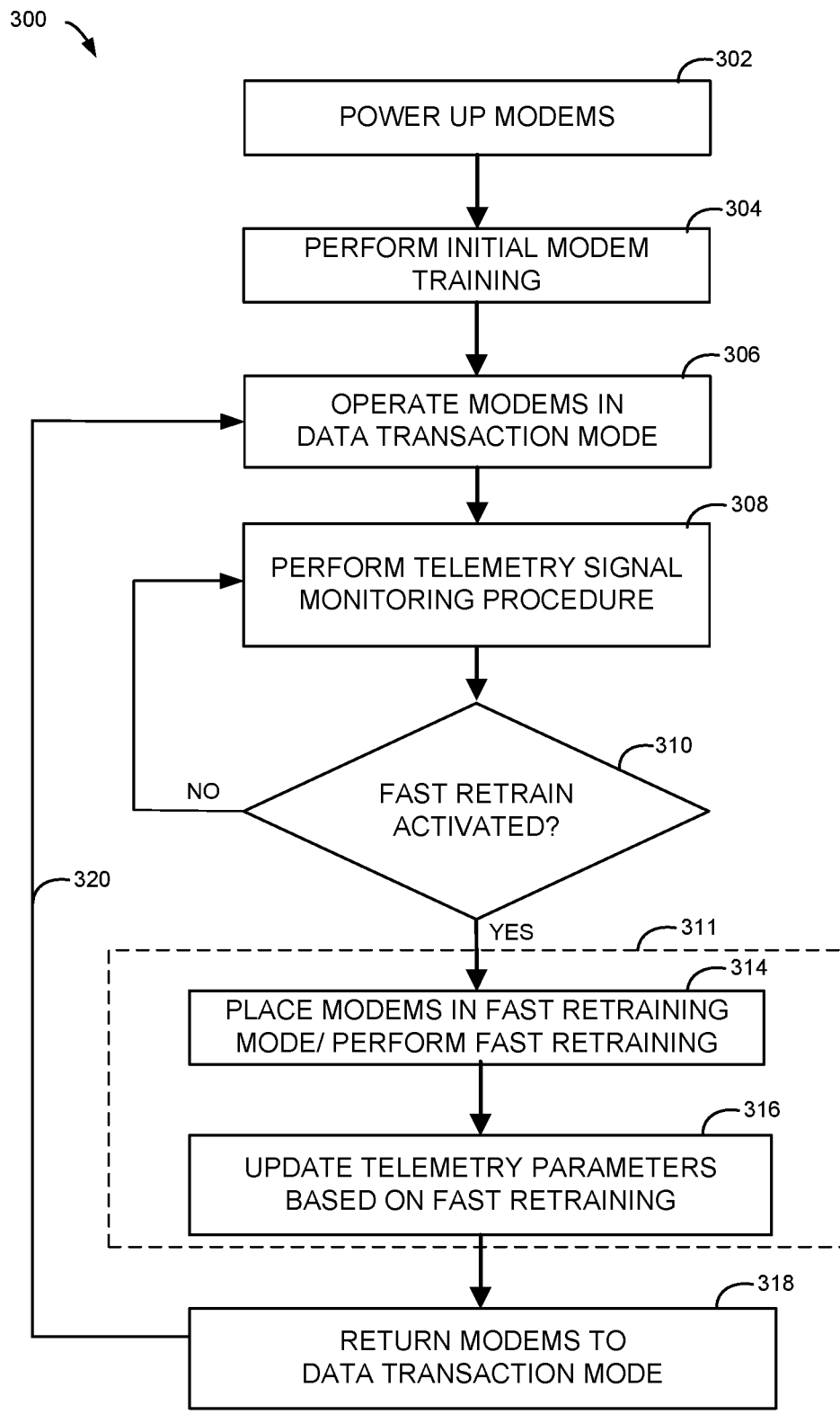
FIG. 3A illustrates a flowchart of a method according to various embodiments.
Figure 3B:
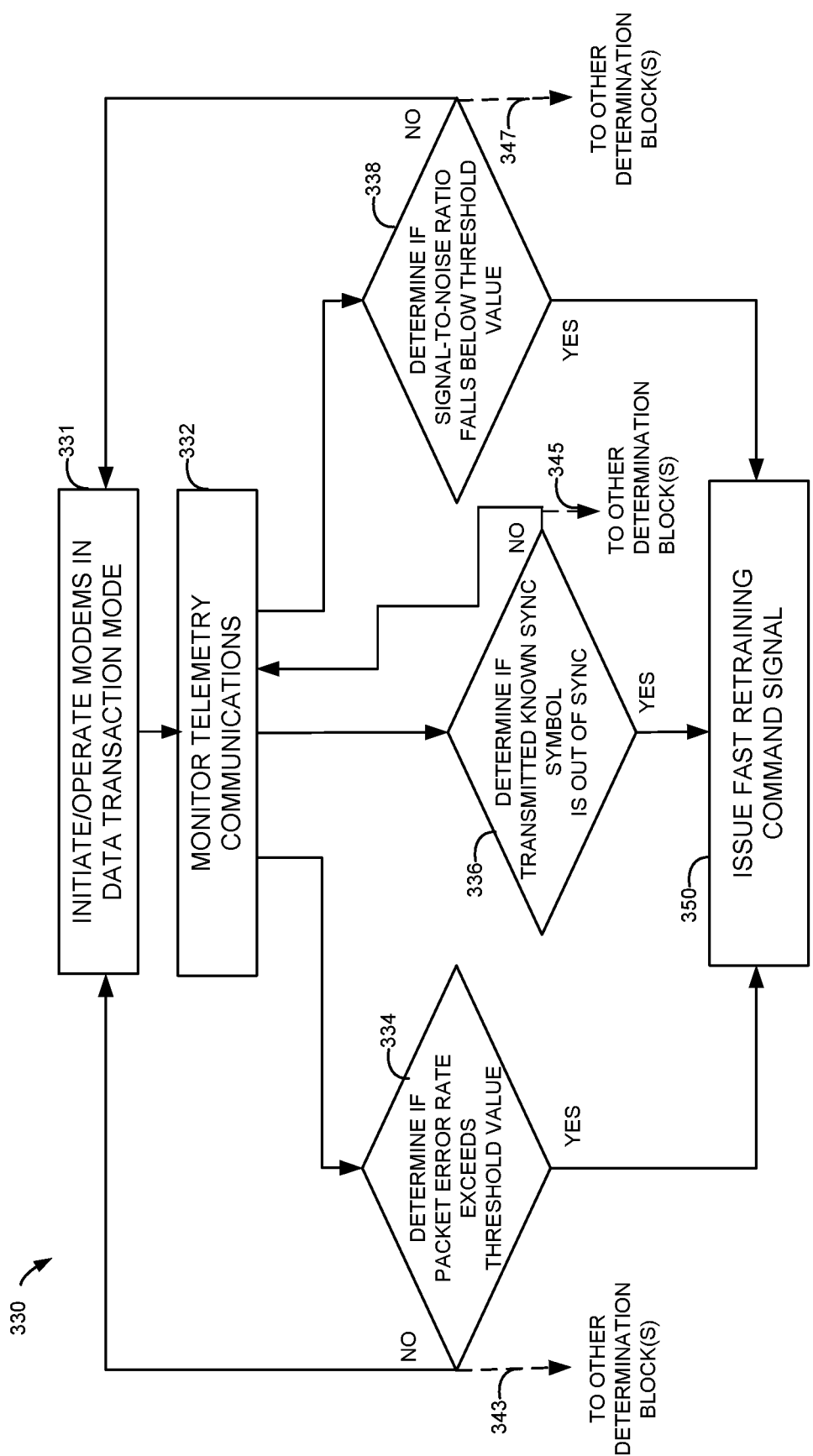
FIG. 3B illustrates a flowchart of a method according to various embodiments.
Figure 3C:
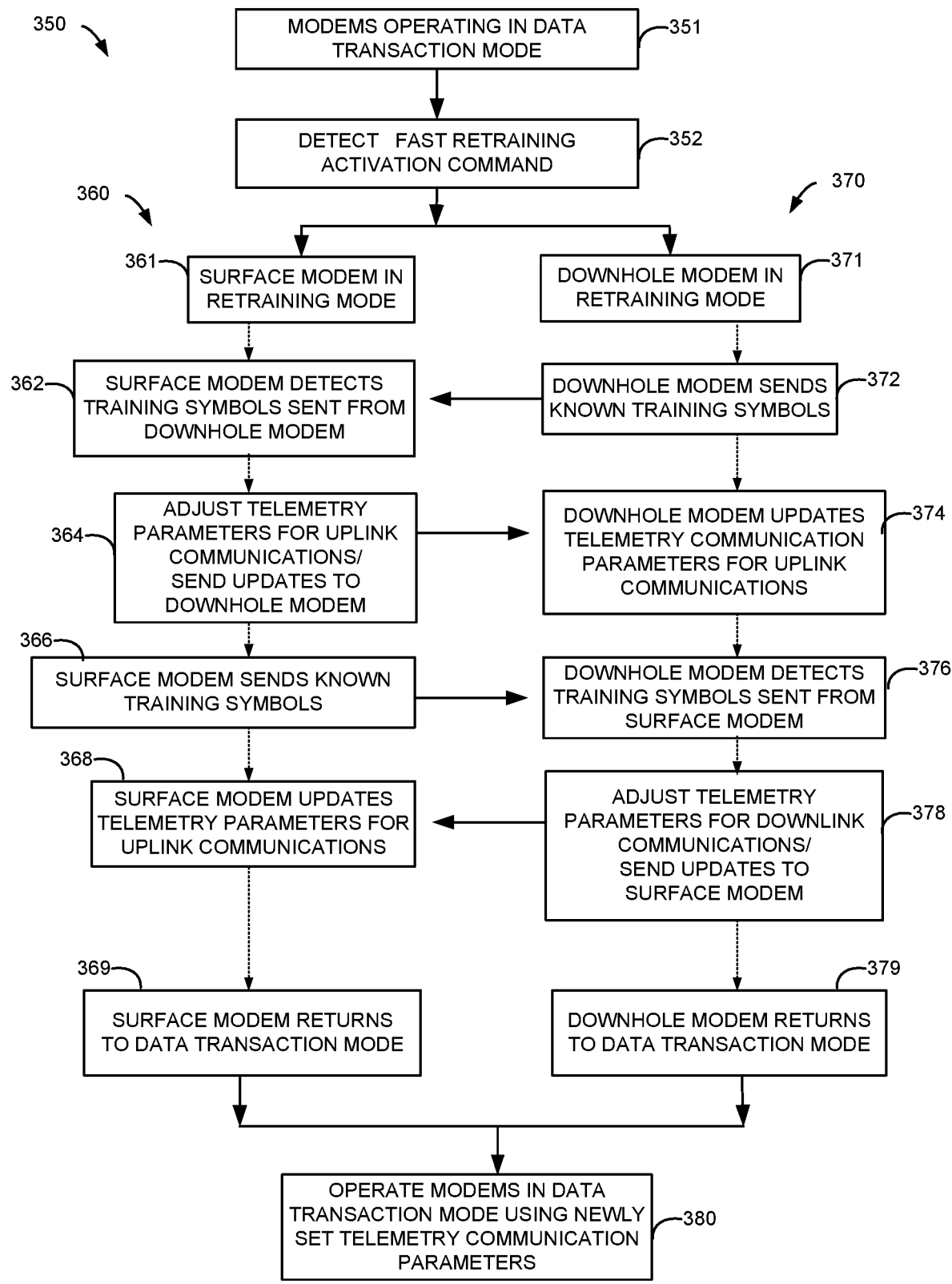
FIG. 3C illustrates a flowchart of a method according to various embodiments.

FIGS. 3A, 3B, and 3C illustrate flowcharts of methods 300, 330, and 350, respectively, according to various embodiments. The flowcharts are provided as an aid to understanding the illustrations, and are not to be used to limit scope of the claims. The flowcharts depict example operations that may vary within the scope of the claims. Additional operations may be performed; fewer operations may be performed; the operations may be performed in parallel; and the operations may be performed in a different order. It will be understood that each block of the flowcharts illustrations and/or block diagrams, and combinations of blocks in the flowcharts illustrations and/or block diagrams, may be implemented by program code. The program code may be provided to one or more processors of a modem, a general purpose computer, a special purpose computer, or other programmable machines or apparatus.

In the description below, various operations included in methods may be described as being performed by one or more processors (hereinafter "the processor") that may be included as part of surface modem 131 and/or as part of a downhole modem, such as modems 131 and 123, respectively, as shown in FIG. 1. However, embodiments of the methods are not limited to having the various operations and method steps being performed by the processor included as part of surface modem 131 and/or downhole modem 123. Portions of or all of the operations and methods steps may be performed in part or wholly by other processors, such as but not limited to processors located in modems included in a logging tool, such as processors located additional modems, such as modem 128, as illustrated and described with respect to FIG. 1. In various embodiments, portions of or all of the operations and methods steps included in the methods may be performed in part or wholly by other processors, such as but not limited to processors located in a computer system coupled to modem 131, such as computer system 135 as illustrated and described with respect to FIG. 1.

FIG. 3A illustrates a flowchart of a method 300 according to various embodiments. Embodiments of method 300 include powering up two or more modems (block 302). In various embodiments, the two or more modems include at least one surface modem, and at least one downhole modem located in a downhole logging tool and configured to be lowered into a borehole. The two or more modems may be communicatively coupled through a wireline including electrical conductors, such as but not limited to conveyance 131 as illustrated and described above with respect to system 100 (FIG. 1).

Embodiments of method 300 include performing initial modem training to set up telemetry communication parameters for use in data communications between the two or more modems. Embodiments of the initial modem training may include sending a known symbol having a predetermined signal strength over a plurality of frequency channels being utilized in a DMT communications format, and determining a SNRi for each of these individual frequency channels, and then allocating a number of data bits that may be communication over each frequency channel respectively, based on the determined SNRi for that particular channel as part of the telemetry communications formatting to be provided between the modems.

Embodiments of method 300 include operating the two or more modems in a data transaction mode following the completion of the initial modem training (block 306). In various embodiments, telemetry communications provided between the modems is formatted based on the communication parameters and the data bit allocations to the frequency channels that were established and set up during the initial modem training.

Embodiments of method 300 include monitoring one or more telemetry signal performance parameters while the two or more modems are in the data transaction mode (block 308). Method 300 may include determining if a fast retrain is activated (block 310). A fast retrain may be activated by generation of or upon receiving a retraining command. The retraining command may be automatically generated in response to a change or changes in one or more communication parameters occurring in the monitored telemetry communications. In various embodiments, the change or changes may include a change in the packet error rate and/or a change in the SNR occurring in the telemetry communications between the modems, and/or a determination that a synchronization (SYNC) symbol being transmitted as part of the telemetry communications occurring between the modems is out of synchronization. In various embodiments, a fast retraining command may be generated in response to receiving an input, for example an input provided by an engineer or a technician, or an input command from another process or system, wherein the input requests activation of a fast retraining of the modems.

When a determination has been made that a fast retraining has been activated, (YES branch extending from block 310), embodiments of method 300 include activating a fast retraining of the two modems (dashed box 311). In various embodiments, the fast retraining of method 300 includes placing the modems in a fast retraining mode, and performing the retraining of the modems without powering down the modems (block 314).

In various embodiments, as part of the retraining and upon completion of the retraining of the modems, method 300 includes updating one or more telemetry parameters for the communications format to be utilized for the telemetry communications between the modems going forward (block 316). Updated telemetry communication parameters may include any combination of adjusting clock rates, adjusting the Frequency-Domain Equalizer (FEQ), adjusting the Time-Domain Equalizer (TEQ), and/or adjusting the bit allocations of data bits across the plurality of frequency channels being utilized for the telemetry communications.

After completion of the updates to the one or more telemetry communication parameters determined as part of the fast retraining of the modems, embodiments of method 300 include returning the modems to a data transaction mode (block 318). After returning the modems to the data transaction mode at block 318, embodiments of method 300 may include returning (as represented by arrow 320) to block 306, wherein the modems again operated in the data transaction mode, and wherein the data communications between the modems is monitored (block 308) to determine if and/or when a fast retraining may again been activated. In various embodiments, the retraining of the modems (block 311) and the return of the modems to the data transaction mode (block 318) occurs while the modems remain powered up. In various embodiments, at least one telemetry communication parameter included in a second set of telemetry communication parameters determined during the retraining of the modems has a value that is different than a value for this same telemetry communication parameter utilized in the first set of telemetry communication parameters utilized by the modems for telemetry communications in the previously concluded data transaction mode.

Returning to block 310 of FIG. 3A, embodiments of method 300 may include that a fast retraining of the modems has not been activated, (NO branch extending from block 310), wherein method 300 includes returning to block 306, which may include continuing to operate the modems in a data transaction mode (block 306), performing telemetry signal monitoring (block 308), and determining if a fast retraining has been activated (block 310). This repeated process of operating, monitoring, and determining, as represented in method 300 by blocks 306, 308 and 310, respectively, may be continued until either a fast retraining of the modems is activated, as described above, or the logging operation being performed by the modems operating in the data transaction mode is completed.

FIG. 3B illustrates a flowchart of a method 330 according to various embodiments. Embodiments of method 330 may include and/or correspond with one or more of the method steps recited above with respect to FIG. 3A and method 300. For example, embodiments of method 330 may include initiating and or continuation of operation of the modems in the data transaction mode (block 331), and monitoring data communications between modems communicating between each other (block 332), which may include any of the features and/or include performing any of the function described above with respect to blocks 306 and 308 of method 300 and FIG. 3A.

Referring back to FIG. 3B, embodiments of method 330 may include determining whether a packet error rate (PER) for the monitored telemetry communication has exceeded a threshold value (block 334). The packet error rate is the ratio of the number of incorrectly received data packets over the total number of received packets. A data packet consists of multiple data symbols. Typically, 10^-3 packet error rate is the threshold value for PER. If a determination is made at block 334 that the PER for the monitored telemetry communications has not exceeded a PER threshold value, (NO branch extending from block 334), method 330 may return to blocks 331 and 332, including continuing to monitor the telemetry communications. In various embodiments, a "NO" determination at block 334 may result in method 330 proceeding to another determination block, such as blocks 336 or 338, as represented by dashed arrow 333. When a determination is made at block 334 that the PER for the monitored telemetry communications has exceeded the PER threshold value, (YES branch extending from block 334), method 330 may include issuing a fast retraining command configured to trigger a fast retraining session of the modems (block 350), which may include any of the features and may including performing any of the functions described above with respect to method 300 and fast retraining of the modems.

Embodiments of method 330 may include determining if a transmitted known SYNC symbol is out of synchronization based on monitoring the telemetry communications occurring between the modems. A SYNC symbol is a pre-defined training symbol with known data pattern. The SYNC symbol is used for Frequency-domain Equalizer (FEQ) adjustment and sampling clock adjustment. When the received SYNC symbol compared to the known data pattern is out of phase, it is determined that the telemetry communication is out of SYNC.

If a determination is made at block 336 that the transmitted known SYNC symbol is not out of synchronization, (NO branch extending from block 3e6), method 330 may return to blocks 331 and 332, including continuing to monitor the telemetry communications. In various embodiments, a "NO" determination at block 3e6 may result in method 330 proceeding to another determination block, such as blocks 334 or 338, and represented by dashed arrow 335. When a determination is made at block 336 that the transmitted SYNC symbol is out of synchronization, (YES branch extending from block 336), method 330 may include issuing a fast retraining command configured to trigger a fast retraining session of the modems (block 350), which may include any of the features and may including performing any of the functions described above with respect to method 300 and fast retraining of the modems.

Embodiments of method 330 may include determining whether a signal-to-noise ratio (SNR) for the monitored telemetry communications has fallen below a SNR threshold value (block 338). Run-time SNRs for all frequency tones are updated on every received SYNC symbol. The updated SNRs will subtract from the SNRs that were used to calculate the number of bits assigned to each frequency tones. If the results on average become negative, it is determined that telemetry communications has fallen below the SNR threshold value.

If a determination is made at block 338 that the SNR has not fallen below a predetermined or setting for a SNR threshold value, (NO branch extending from block 338), method 330 may return to blocks 331 and 332, including continuing to monitor the telemetry communications. In various embodiments, a "NO" determination at block 338 may result in method 330 proceeding to another determination block, such as blocks 334 or 336, as represented by dashed arrow 337. When a determination is made at block 338 that the SNR for the monitored telemetry communications has fallen below the predetermined or setting for the SNR threshold value, (YES branch extending from block 338), method 330 may include issuing a fast retraining command configured to trigger a fast retraining session of the modems (block 350), which may include any of the features and may including performing any of the functions described above with respect to method 300 and fast retraining of the modems.

Embodiments of method 330 may include making the determinations at block 334, 336, and/or 338 on a periodic basis, for example at a predetermined time interval from a time when the previous set of determination(s) was made. The determinations made at blocks 334, 336, and 338 may all be performed subsequentially at a same periodic time interval, such as every 100 milliseconds, or some other predefined time interval, wherein each of the determinations are made at the same predetermined time interval. In other embodiments, one or more of the determinations made by method 330 at blocks 334, 336, and 338 may be made periodically at a first time interval that is different from one or more of time intervals used to periodically make other determinations utilized by method 330 in order to determine if a fast retraining command should be issued.

Embodiments of method 330 may include making one or more of the determinations of blocks 334, 336, and/or 338 based on a periodic time interval, while making one more of the determinations based on a particular triggering event, such as a jarring of the logging tool, starting up of a particular device included in the logging tool such as a power supply that is part of the logging tool, extend the logging tool to a predetermined depth within the borehole where the logging tool is being operated, and/or based on an input requesting that a fast retraining session of the modems be performed. Other variations as to the interval of making the determinations and/or of the triggering events that trigger making the determinations as illustrated and described with respect to method 330 are possible, and are contemplated for use in the execution of method 330.

Any of the criteria, such as packet error rate, SYNC symbol, or signal-to-noise ratio, that may be monitored as part of method 330 may be referred to as "telemetry quality indicators." The type of telemetry quality indicator(s) may be utilized to determine a triggering of a fast retraining of the modems is not limited to any particular type of quality indicator, and is not limited to the examples specifically described herein with respect to method 330. Any type of quality indictor that may be indicative of a parameter associated with the telemetry communications occurring between the modems and that can be monitored and detected may be included and utilized as a telemetry quality indicator for use in making a determination as to whether and/or when to trigger a fast retraining of the modems. Further, any of the telemetry parameters that may be adjusted as part of the fast retraining of the modems may or may not include a same parameter or a same set of parameters as was monitored for as part of the telemetry communications and that triggered the fast retraining of the modems.

FIG. 3C illustrates a flowchart of a method 350 according to various embodiments. Embodiments of method 350 include modems, such as surface modem 131 and a downhole modem, such as downhole modem 123, operating in a data transaction mode (block 351). Operating in the data transaction mode may include the surface modem and the downhole modem transmitting and receiving telemetry communication signals between the modems, using one-way and/or two-way communications. Block 351 of method 350 may correspond with and/or include any of the features described above with respect to blocks 302, 304, 306, and 308 of method 300 (FIG. 3A) and/or block 342 of method 330 (FIG. 3B).

While operating in the data transaction mode, method 350 (FIG. 3C) may include detection of a fast retraining command (block 352). The fast retraining command may be generated by any the methods or techniques described throughout this disclosure, including any of the methods or techniques described with respect to block 310 of method 300 (FIG. 3A), and/or any other methods or techniques described with respect to one or more of blocks 334, 336, and 338 of method 330 (FIG. 3B). For example, a fast retraining command may be generated in response to a determination that a packet error rate has exceeded a PER threshold value, that a transmitted SYNC symbol is out of synchronization, and/or that a SNR for the telemetry communications has dropped below a SNR threshold level. The generation of the fast retraining command may be a result of receiving an input requesting that the fast retraining of the modems be performed. The generation of the fast retraining command may be a result of detection of some event, such as a jarring of the logging tool, or a change in operation of the logging tool, such as the switching on of a particular device, such as a power supply that is part of the logging tool.

Referring back to method 350 and FIG. 3C, following detection of activation of the fast retraining command, method 350 includes operations performed by the surface modem, which are generally indicated by the blocks in the left-hand column 360 of FIG. 3C, and operations performed by the downhole modem, which are generally indicated by the blocks in the right-hand column 370 of FIG. 3C. As shown in FIG. 3C, following detection of the activation of the fast retraining command, method 350 includes the surface modem switching to a retraining mode (block 361), and the downhole modem switching to the retraining mode (block 371).

Once in the retraining mode, embodiments of method 350 include the downhole modem sending one or more known training symbols to the surface modem (block 372). Embodiments of method 350 include the surface modem detecting the training symbols sent from the downhole modem (block 362), and in response to the detection of the one or more training symbols, the surface modem adjusting one or more of the telemetry parameters used for uplink data communications sent from the downhole modem to the surface modem once the modems return to a data transaction mode following retraining (block 364). Adjustments to the telemetry parameters may include adjusting sampling clock that is used to adjust the receiver clock to be the same as the transmitter clock, adjusting frame alignment that is used to find where the frame starts, adjusting frequency-domain equalizer (FEQ) that is used to undo the channel distortions to recover the data symbols, adjusting the Time-domain Equalizer (TEQ) that is used to shorten the channel response to minimum the inter-symbol interference, and/or adjusting bit allocation over the available frequency channels available to provide the uplink data communications.

Embodiments of method 350 includes the surface modem sending the updated telemetry communication parameters for the uplink communications, including any newly determined bit allocations for the uplink telemetry communications, to the downhole modem at block 364.

Embodiments of method 350 include the downhole modem receiving the adjusted telemetry parameters associated with the uplink communications sent from the surface modem, and updating the telemetry communication parameters for the uplink communications based on the telemetry parameters provided by the surface modem (block 374). Updating the telemetry communication parameters may include updating a bit allocation table stored at the downhole modem based on the new bit allocations provided by the surface modems as part of the updated telemetry parameters for the uplink telemetry communications.

Embodiments of method 350 may further include the surface modem sending one or more known training symbols to the downhole modem (block 366). Embodiments of method 350 include the downhole modem detecting the training symbols sent from the surface modem (block 376), and in response to the detection of the one or more known training symbols, the downhole modem adjusting one or more of the telemetry parameters to be used for downlink data communications sent from the surface modem to the downhole modem once the modems return to a data transaction mode following retraining (block 378). Adjustment to the telemetry parameter may include adjustments to the clock frequency used for the uplink data communications. Adjustments to the telemetry parameters may include adjusting sampling clock that is used to adjust the receiver clock to be the same as the transmitter clock, adjusting frame alignment that is used to find where the frame starts, adjusting frequency-domain equalizer (FEQ) that is used to undo the channel distortions to recover the data symbols, adjusting the Time-domain EQualizer (TEQ) that is used to shorten the channel response to minimum the inter-symbol interference, and/or adjusting bit allocation over the available frequency channels available to provide the uplink data communications.

Embodiments of method 350 include the downhole modem sending the updated telemetry communication parameters for the downlink communications, including the updated bit allocations, to the surface modem at block 378. Embodiments of method 350 include the surface modem receiving the adjusted telemetry parameters associated with the downlink communications sent from the downhole modem, and updating the telemetry communication parameters for the downlink communications based on the telemetry parameters provided by the downhole modem (block 368). Updating the telemetry communication parameters may include updating a bit allocation table stored at the surface modem based on the new bit allocations provided by the downhole modem as part of the updated telemetry parameters for the downlink telemetry communications.

Upon completion of the updates for the uplink and the downlink data communications, embodiments of method 350 include the surface modem returning to the data transaction mode (block 369), and the downhole modem returning to the data transaction mode (block 379). Following the return of the surface modem and the downhole modem to the data transaction mode, embodiments of method 350 include operating the surface modem and the downhole modem in data transaction mode to provide telemetry communications between the surface modem and the downhole modem using the newly set telemetry communication parameters established during the most recent retraining mode (block 380). Operating the modems in the data transaction mode using the newly set telemetry communication parameters may include operating the modems as described above for block 351, including transmitting and receiving telemetry communication signals between the modems, using one-way and/or two-way communications, while monitoring for detection of another activation request for a fast retraining session to be performed, as described above with respect to block 352. While operating in the data transaction mode, method 350 may include detecting a fast retraining command (block 352), and repeating the retraining process described above to again set the one or more of the telemetry communication parameters to be utilized for telemetry communications between the modems.

Embodiments of method 350 are not limited to a single cycle of the retraining, and for example may include a plurality of separate retraining cycles, each retraining cycle triggered by a detection of a fast retraining command during a time when the modems are operating in the data transaction mode. In addition, operation of the modems in the data transaction mode may end when a signal indicating that the logging operation has been completed is received by the modems. Other variations of the method 350 are possible, and are contemplated for use in embodiments of method 350. For example, various embodiments of method 350 may include the surface modem sending the known training symbols to the downhole modem (block 366) prior to the downhole modem sending the known training symbols to the surface modem (block 372) as part of the sequence of events performed as part of a retraining procedure of method 350.

In various embodiments of method 350, the type of adjustments made to the telemetry parameters may be based, either wholly or at least in part, on the triggering event that caused the fast retraining command to be generated. For example, a triggering event that was automatically generated by the modems based on the monitoring of the telemetry communications may cause the modems to adjust a certain set of the telemetry communication parameters, while a triggering event that was generated for example by an input requesting a retraining of the modems may cause the modems to adjust one or more of the telemetry communication parameters that are different from, or that may be adjusted to different levels, compared to the adjustments made in response to the automatically generated triggering of the fast retraining command.

Figure 4:
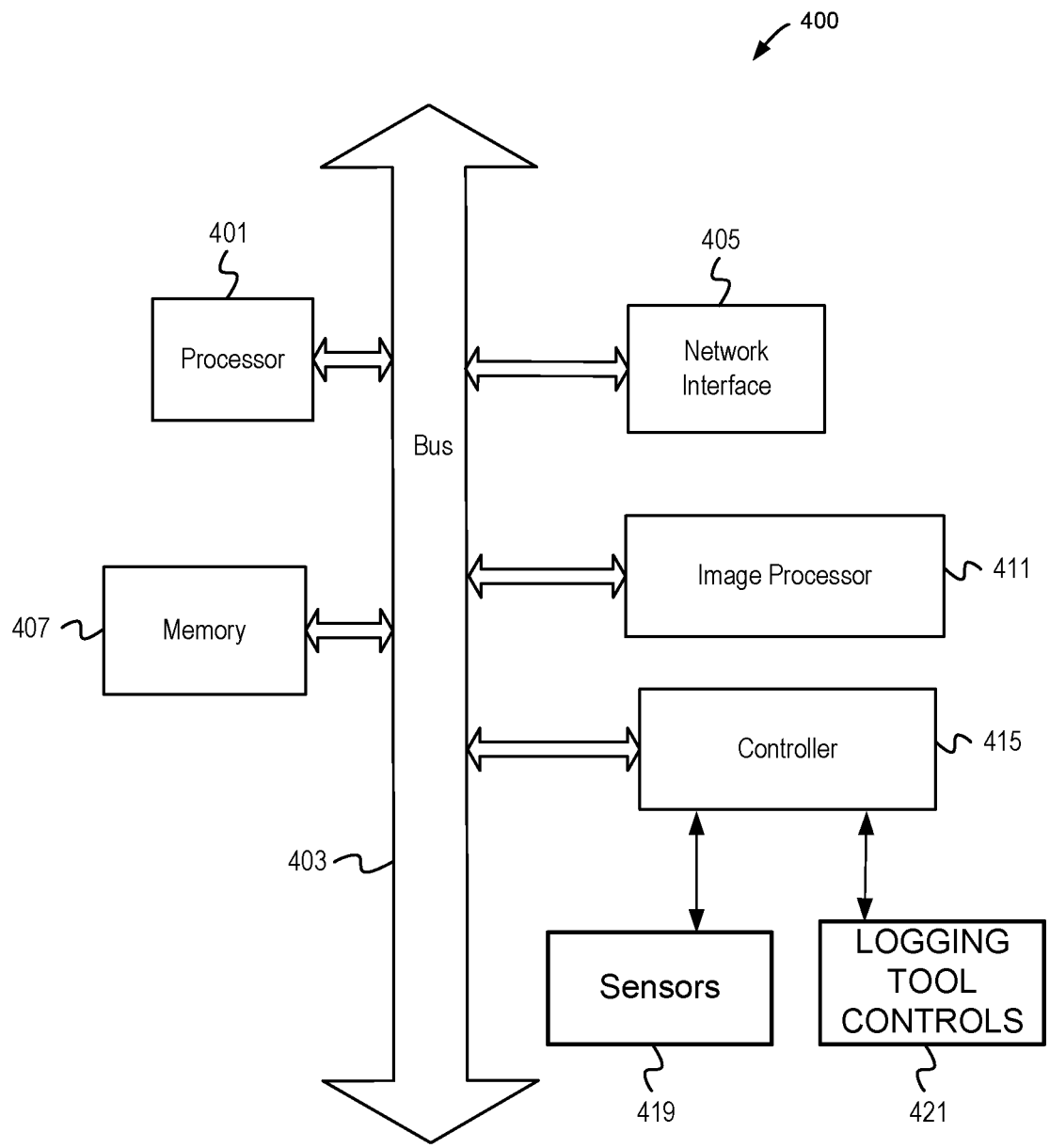
FIG. 4 illustrates a block diagram of a computer system according to various embodiments.

FIG. 4 illustrates a block diagram of an example computing system 400 that may be employed to practice the concepts, methods, and techniques disclosed herein, and variations thereof. The computing system 400 includes a plurality of components of the system that are in electrical communication with each other, in some examples using a bus 403. The computing system 400 may include any suitable computer, controller, or data processing apparatus capable of being programmed to carry out the method and apparatus as further described herein. In various examples, one or more components illustrated and described with respect to computing system 400 may be included in or as a component of modem 131, and/or any of modems 123 to 128 as illustrated and described with respect to FIG. 1, and may include any of the features and/or be configured to perform any of the function described with respect to these modems, including any of the methods and techniques described throughout this disclosure, and any equivalents thereof.

Referring back to FIG. 4, computer system 400 may be a general-purpose computer, or a computing device packaged to withstand the downhole environment, including temperature sand shock stresses that may be encountered in a borehole. In various embodiments, computer system 400 includes a processor 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the possible realizations of machine-readable media. The computer system also includes the bus 403 (e.g., PCI, ISA, PCI-Express, HyperTransport® bus, InfiniBand® bus, NuBus, etc.) and a network interface 405 (e.g., a Fiber Channel interface, an Ethernet interface, an internet small computer system interface, SONET interface, wireless interface, etc.).

The computer may also include an image processor 411 and a controller 415. The controller 415 may control the different operations that can occur in the response inputs from sensors 419 and/or calculations based on inputs from sensors 419 (such as sensors included in logging tool 120, FIG. 1) using any of the techniques described herein, and any equivalents thereof. For example, the controller 415 can receive and/or process signal received from one or more sensors 419 included in logging tool. In various embodiments, controller 415, based on instructions from processor

401, may control one or more logging tools, for example to place one or more of the logging tools into an off mode or a silent mode.

Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). As illustrated in FIG. 4, the processor 401 and the network interface 405 are coupled to the bus 403. Although illustrated as also being coupled to the bus 403, the memory 407 may be coupled to the processor 401 only, or both processor 401 and bus 403.

Controller 415 may be coupled to sensors 419 and to logging tools controls 421 using any type of wired or wireless connection(s), and may receive data, such as measurement data, obtained by sensors 419. Sensors 419 may include any of the sensors associated with a wellbore environment, including sensors and logging tools such as a High-Fidelity Borehole Imager configured provide information related to micro-resistivity associated with the borehole environment. Controller 415 may include circuitry, such as analog-to-digital (A/D) converters and buffers that allow controller 415 to receive electrical signals directly from one or more of sensors 419.

Processor 401 may be configured to perform one or more of the data telemetry communication functions as described throughout this disclosure, and any equivalents thereof. For example, processor 401 may be configured to perform program steps that when perform, provide any of the features described above with respect to configuring data communications between a logging tool and a surface modem. In addition, processor 401 may be configured to control network interface in order to provide data communications to and/or from computing system 400 using any of the methods and techniques for configuring the data transmissions as described throughout this disclosure, and any equivalents thereof.

With respect to computing system 400, basic features may easily be substituted for improved hardware or firmware arrangements as they are developed. In some examples, memory 407 includes non-volatile memory and can be a hard disk or other types of computer readable media which can store data that are accessible by a computer, such as magnetic cassettes, flash memory cards, solid state memory devices, digital versatile disks (DVDs), cartridges, RAM, ROM, a cable containing a bit stream, and hybrids thereof.

It will be understood that one or more blocks of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus. As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. While depicted as a computing system 400 or as a general purpose computer, some embodiments can be any type of device or apparatus to perform operations described herein.

Aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium, including non-transitory computer readable mediums, may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. Plural instances may be provided for components, operations or structures described herein as a single instance. For example, reference to "a processor" in the disclosure and in the claims is not limited to use of a single processor along, and may include a plurality of processors operating in some manner to perform the function(s) and features ascribed to the processor. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

Embodiments of the systems, apparatus, methods, and techniques as described herein may include the following embodiments.

Embodiment 1. A method comprising: placing two or more modems into a data transaction mode and providing data communications between the two or more modems in a borehole environment based on a first set of telemetry communication parameters; monitoring one or more telemetry quality indicators determined for telemetry communications occurring between the two or more modems; triggering activation of a fast retraining of the two or more modems based on the monitoring of the one or more telemetry quality indicators; and performing the fast retraining of the two or more modems without powering down the two or more modems, the fast retraining generating an adjustment to one or more telemetry communication parameters in the first set of telemetry communication parameters to generate a second set of telemetry communication parameters to be utilized for telemetry communications between the two or more modems following completion of the fast retraining. Embodiment 2. The method of embodiment 1, further comprising: placing the two or more modems back into the data transaction mode; and providing telemetry communications between the two or more modems using the second set of telemetry communication parameters. Embodiment 3. The method of embodiments 1 or 2, wherein triggering activation of the fast retraining of the two or more modems includes determining that a packet-error-rate for the telemetry communications occurring between the two or more modems during the data transaction mode has exceeded a packet-error-rate threshold value. Embodiment 4. The method of embodiments 1 or 2, wherein triggering activation of the fast retraining of the two or more modems includes determining that a synchronization symbol transmitted between the two or more modems as part of the telemetry communications is out of synchronization. Embodiment 5. The method of embodiments 1 or 2, wherein triggering activation of the fast retraining of the two or more modems includes determining that a signal-to-noise ratio measured for the telemetry communications occurring between the two or more modems during the data transaction mode has exceeded a signal-to-noise ratio threshold value.

Embodiment 6. The method of embodiments 1 or 2, further comprising: receiving an input signal requesting the triggering of the fast retraining of the two or more modems; and triggering activation of the fast retraining of the two or more modems based on receiving the input signal. Embodiment 7. The method of embodiments 1 or 2, further comprising: detecting the occurrence of an event associated with a logging operation being performed by the two or more modems; and triggering activation of the fast retraining of the two or more modems based on a detection of the detection of the event. Embodiment 8. The method of any of embodiments 1-7, wherein performing the fast retraining of the two or more modems includes: a downhole modem included in the two or more modems sending one or more known training symbols to a surface modem included in the two or more modems; the surface modem detecting the one or more known training symbols sent by the downhole modem, adjusting one or more telemetry parameters associated with a set of uplink communication parameters for providing telemetry communications from the downhole modem to the surface modem, and sending the adjusted set of uplink communication parameters back to the downhole modem for use in providing the uplink telemetry communications between the downhole modem and the surface modem following completion of the fast retraining. Embodiment 9. The method of any of embodiments 1-8, wherein performing the fast retraining of the two or more modems includes: a surface modem included in the two or more modems sending one or more known training symbols to a downhole modem included in the two or more modems; the downhole modem detecting the one or more known training symbols sent by the surface modem, adjusting one or more telemetry parameters associated with a set of downlink communication parameters for providing telemetry communications from the surface modem to the downhole modem, and sending an adjusted set of downlink communication parameters back to the surface modem for use in providing the downlink telemetry communications between the surface modem and the downlink modem following completion of the fast retraining. Embodiment 10. The method of any of embodiments 1-9, further comprising: initially powering up the two or more modems; and performing an initial training procedure on the two or more modems to determine an initial set of telemetry communication parameters to be used for providing telemetry communications between the two or more modems in the borehole environment prior to performing the fast retraining of the two or more modems.

Embodiment 11. A system comprising: two or more modems communicatively coupled together to provide telemetry communications in a borehole environment between a surface modem and one or more downhole modems included as part of a downhole logging tool, the system configured to: place the two or more modems into a data transaction mode and providing data communications between the two or more modems in a borehole environment based on a first set of telemetry communication parameters; monitor one or more telemetry quality indicators determined for the telemetry communications occurring between the two or more modems; trigger activation of a fast retraining of the two or more modems based on the monitoring of the one or more telemetry quality indicators; and perform the fast retraining of the two or more modems without powering down the two or more modems, the fast retraining generating an adjustment to one or more telemetry communication parameters in the first set of telemetry communication parameters to generate a second set of telemetry communication parameters to be utilized for telemetry communications between the two or more modems following completion of the fast retraining. Embodiment 12. The system of embodiment 11, wherein the system is configured to trigger activation of the fast retraining of the two or more modems based on making a determination that a packet-error-rate for the telemetry communications occurring between the two or more modems during the data transaction mode has exceeded a packet-error-rate threshold value. Embodiment 13. The system of embodiment 11, wherein the system is configured to trigger activation of the fast retraining of the two or more modems based on making a determination that a synchronization symbol transmitted between the two or more modems as part of the telemetry communications is out of synchronization. Embodiment 14. The system of embodiment 11, wherein the system is configured to trigger activation of the fast retraining of the two or more modems based on making a determination that a signal-to-noise ratio measured for the telemetry communications occurring between the two or more modems during the data transaction mode has exceeded a signal-to-noise ratio threshold value. Embodiment 15. The system of embodiment 11, wherein the system is further configured to: receive an input signal requesting the triggering of the fast retraining of the two or more modems; and trigger activation of the fast retraining of the two or more modems based on receiving the input signal. Embodiment 16. The system of embodiment 11, wherein the system is further configured to: detect the occurrence of an event associated with a logging operation being performed by the two or more modems; and trigger activation of the fast retraining of the two or more modems based on a detection of the detection of the event. Embodiment 17. The system of any of embodiments 11-16, wherein performing the fast retraining of the two or more modems includes: the downhole modem sending one or more known training symbols to the surface modem; the surface modem detecting the one or more known training symbols sent by the downhole modem, adjusting one or more telemetry parameters associated with a set of uplink communication parameters for providing telemetry communications from the downhole modem to the surface modem, and sending the adjusted set of uplink communication parameters back to the downhole modem for use in providing the uplink telemetry communications between the downhole modem and the surface modem following completion of the fast retraining. Embodiment 18. The system any of embodiments 11-17, wherein the system is configured to perform the fast retraining of the two or more modems including: the surface modem sending one or more known training symbols to the downhole modem; the downhole modem detecting the one or more known training symbols sent by the surface modem, adjusting one or more telemetry parameters associated with a set of downlink communication parameters for providing telemetry communications from the surface modem to the downhole modem, and sending an adjusted set of downlink communication parameters back to the surface modem for use in providing the downlink telemetry communications between the surface modem and the downlink modem following completion of the fast retraining.

Embodiment 19. A non-transitory computer-readable medium having instructions stored thereon that are executable by a computing device to perform operations comprising: placing two or more modems into a data transaction mode and providing data communications between the two or more modems in a borehole environment based on a first set of telemetry communication parameters; monitoring one or more telemetry quality indicators determined for the telemetry communications occurring between the two or more modems; triggering activation of a fast retraining of the two or more modems based on the monitoring of the one or more telemetry quality indicators; and performing the fast retraining of the two or more modems without powering down the two or more modems, the fast retraining generating an adjustment to one or more telemetry communication parameters in the first set of telemetry communication parameters to generate a second set of telemetry communication parameters to be utilized for telemetry communications between the two or more modems following completion of the fast retraining. Embodiment 20. The A non-transitory computer-readable medium of claim 19 having instructions stored thereon that are executable by the computing device to perform operations further comprising: placing the two or more modems back into the data transaction mode; and providing telemetry communications between the two or more modems using the second set of telemetry communication parameters.

What is claimed is:

1. A method comprising:
placing two or more modems into a data transaction mode and providing telemetry communications between the two or more modems through a cable in a borehole environment, the telemetry communications based on a first set of telemetry communication parameters and comprising one or more data bursts including one or more data bits assigned to each one of a plurality of frequency channels defined over a predetermined frequency range, each frequency channel of the plurality of frequency channels having a number of data bits assigned to the frequency channel based on a signal-to-noise ratio determined for the frequency channel compared to a minimum signal-to-noise ratio determined for the telemetry communications;

monitoring one or more telemetry quality indicators determined for the telemetry communications occurring between the two or more modems;

triggering activation of a fast retraining of the two or more modems based on the monitoring of the one or more telemetry quality indicators, including triggering activation of the fast retraining of the two or more modems based on determining that a synchronization symbol transmitted between the two or more modems as part of the telemetry communications is out of synchronization; and performing the fast retraining of the two or more modems without powering down the two or more modems, the fast retraining generating an adjustment to one or more telemetry communication parameters in the first set of telemetry communication parameters to generate a second set of telemetry communication parameters to be utilized for the telemetry communications between the two or more modems following completion of the fast retraining.

2. The method of claim 1, further comprising:
placing the two or more modems back into the data transaction mode; and
providing the telemetry communications between the two or more modems using the second set of telemetry communication parameters.

3. The method of claim 1, wherein triggering activation of the fast retraining of the two or more modems includes determining that a packet-error-rate for the telemetry communications occurring between the two or more modems during the data transaction mode has exceeded a packet-error-rate threshold value.

4. The method of claim 1, wherein the synchronization symbol transmitted between the two or more modems as part of the telemetry communications comprises a pre-defined training symbol with a known data pattern.

5. The method of claim 1, wherein triggering activation of the fast retraining of the two or more modems includes determining that a signal-to-noise ratio measured for the telemetry communications occurring between the two or more modems during the data transaction mode has fallen below a signal-to-noise ratio threshold value.

6. The method of claim 1, further comprising:
receiving an input signal requesting the triggering of the fast retraining of the two or more modems; and
triggering activation of the fast retraining of the two or more modems based on receiving the input signal.

7. The method of claim 1, further comprising:
detecting the occurrence of an event associated with a logging operation being performed by the two or more modems; and
triggering activation of the fast retraining of the two or more modems based on a detection of the event.

8. The method of claim 1, wherein performing the fast retraining of the two or more modems includes:
a downhole modem included in the two or more modems sending one or more known training symbols to a surface modem included in the two or more modems; and
the surface modem detecting the one or more known training symbols sent by the downhole modem, adjusting one or more telemetry parameters associated with a set of uplink communication parameters for providing the telemetry communications from the downhole modem to the surface modem, and sending the adjusted set of uplink communication parameters back to the downhole modem for use in providing the uplink telemetry communications between the downhole modem and the surface modem following completion of the fast retraining.

9. The method of claim 1, wherein performing the fast retraining of the two or more modems includes:
a surface modem included in the two or more modems sending one or more known training symbols to a downhole modem included in the two or more modems; and
the downhole modem detecting the one or more known training symbols sent by the surface modem, adjusting one or more telemetry parameters associated with a set of downlink communication parameters for providing a downlink telemetry communications from the surface modem to the downhole modem, and sending an adjusted set of downlink communication parameters back to the surface modem for use in providing the downlink telemetry communications between the surface modem and the downhole modem following completion of the fast retraining.

10. The method of claim 1, further comprising:
initially powering up the two or more modems; and
performing an initial training procedure on the two or more modems to determine an initial set of telemetry communication parameters to be used for providing the telemetry communications between the two or more modems in the borehole environment prior to performing the fast retraining of the two or more modems.

11. A system comprising:
two or more modems communicatively coupled together to provide telemetry communications through a cable in a borehole environment between a surface modem and one or more downhole modems included as part of a downhole logging tool, the system configured to:
place the two or more modems into a data transaction mode and providing the telemetry communications between the two or more modems based on a first set of telemetry communication parameters and comprising one or more data bursts including one or more data bits assigned to each one of a plurality of frequency channels defined over a predetermined frequency range, each frequency channel of the plurality of frequency channels having a number of data bits assigned to the frequency channel based on a signal-to-noise ratio determined for the frequency channel compared to a minimum signal-to-noise ratio determined for the telemetry communications;
monitor one or more telemetry quality indicators determined for the telemetry communications occurring between the two or more modems;
trigger activation of a fast retraining of the two or more modems based on the monitoring of the one or more telemetry quality indicators, wherein the system is configured to trigger activation of the fast retraining of the two or more modems based on making a determination that a synchronization symbol transmitted between the two or more modems as part of the telemetry communications is out of synchronization; and
perform the fast retraining of the two or more modems without powering down the two or more modems, the fast retraining generating an adjustment to one or more telemetry communication parameters in the first set of telemetry communication parameters to generate a second set of telemetry communication parameters to be utilized for the telemetry communications between the two or more modems following completion of the fast retraining.

12. The system of claim 11, wherein the system is configured to trigger activation of the fast retraining of the two or more modems based on making a determination that a packet-error-rate for the telemetry communications occurring between the two or more modems during the data transaction mode has exceeded a packet-error-rate threshold value.

13. The system of claim 11, wherein the synchronization symbol transmitted between the two or more modems as part of the telemetry communications comprises a pre-defined training symbol with a known data pattern.

14. The system of claim 11, wherein the system is configured to trigger activation of the fast retraining of the two or more modems based on making a determination that a signal-to-noise ratio measured for the telemetry communications occurring between the two or more modems during the data transaction mode has fallen below a signal-to-noise ratio threshold value.

15. The system of claim 11, wherein the system is further configured to:
receive an input signal requesting the triggering of the fast retraining of the two or more modems; and
trigger activation of the fast retraining of the two or more modems based on receiving the input signal.

16. The system of claim 11, wherein the system is further configured to:
detect the occurrence of an event associated with a logging operation being performed by the two or more modems; and
trigger activation of the fast retraining of the two or more modems based on a detection of the event.

17. The system of claim 11, wherein performing the fast retraining of the two or more modems includes:
a downhole modem of the one or more downhole modems sending one or more known training symbols to the surface modem; and
the surface modem detecting the one or more known training symbols sent by the downhole modem, adjusting one or more telemetry parameters associated with a set of uplink communication parameters for providing telemetry communications from the downhole modem to the surface modem, and sending the adjusted set of uplink communication parameters back to the downhole modem for use in providing the uplink telemetry communications between the downhole modem and the surface modem following completion of the fast retraining.

18. The system of claim 11, wherein the system is configured to perform the fast retraining of the two or more modems including:
the surface modem sending one or more known training symbols to a downhole modem of the one or more downhole modems; and
the downhole modem detecting the one or more known training symbols sent by the surface modem, adjusting one or more telemetry parameters associated with a set of downlink communication parameters for providing a downlink telemetry communications from the surface modem to the downhole modem, and sending an adjusted set of downlink communication parameters back to the surface modem for use in providing the downlink telemetry communications between the surface modem and the downhole modem following completion of the fast retraining.

19. A non-transitory machine readable storage medium having instructions stored thereon that are executable by a computing device to perform operations comprising:
placing two or more modems into a data transaction mode configured for providing telemetry communications between the two or more modems through a cable in a borehole environment based on a first set of telemetry communication parameters and comprising one or more data bursts including one or more data bits assigned to each one of a plurality of frequency channels defined over a predetermined frequency range, each frequency channel of the plurality of frequency channels having a number of data bits assigned to the frequency channel based on a signal-to-noise ratio determined for the frequency channel compared to a minimum signal-to-noise ratio determined for the telemetry communications;
monitoring one or more telemetry quality indicators determined for the telemetry communications occurring between the two or more modems;
triggering activation of a fast retraining of the two or more modems based on the monitoring of the one or more telemetry quality indicators, including triggering activation of the fast retraining of the two or more modems based on determining that a synchronization symbol transmitted between the two or more modems as part of the telemetry communications is out of synchronization; and
performing the fast retraining of the two or more modems without powering down the two or more modems, the fast retraining generating an adjustment to one or more telemetry communication parameters in the first set of telemetry communication parameters to generate a second set of telemetry communication parameters to be utilized for the telemetry communications between the two or more modems following completion of the fast retraining.

20. The non-transitory machine readable storage medium of claim 19 having instructions stored thereon that are executable by the computing device to perform operations further comprising:
placing the two or more modems back into the data transaction mode configured for providing the telemetry communications between the two or more modems using the second set of telemetry communication parameters.

* * * * *